United States Patent
Seo et al.

(10) Patent No.: US 12,454,698 B2
(45) Date of Patent: Oct. 28, 2025

(54) TRANSGENIC PLANT WITH REDUCED HEAVY METALS AND METHODS FOR PREPARATION THEREOF

(71) Applicant: KT&G CORPORATION, Daejeon (KR)

(72) Inventors: Hyo Seok Seo, Sejong (KR); Young Gi Lee, Daejeon (KR); Jeong Heon Lee, Daejeon (KR); Kwang Chul Kim, Daejeon (KR); Woong Hyun Na, Daejeon (KR); Kyoung Hwan Oh, Cheongju-si (KR); Eun Young Jeon, Sejong (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 17/642,050

(22) PCT Filed: Aug. 19, 2021

(86) PCT No.: PCT/KR2021/011059
§ 371 (c)(1),
(2) Date: Mar. 10, 2022

(87) PCT Pub. No.: WO2022/055144
PCT Pub. Date: Mar. 17, 2022

(65) Prior Publication Data
US 2024/0052360 A1 Feb. 15, 2024

(30) Foreign Application Priority Data
Sep. 8, 2020 (KR) .................. 10-2020-0114891

(51) Int. Cl.
*C12N 15/82* (2006.01)
*C12N 9/10* (2006.01)
*C12N 9/22* (2006.01)
*C12N 15/11* (2006.01)

(52) U.S. Cl.
CPC ......... *C12N 15/8271* (2013.01); *C12N 9/104* (2013.01); *C12N 9/22* (2013.01); *C12N 15/11* (2013.01); *C12Y 203/02015* (2013.01); *C12N 2310/20* (2017.05)

(58) Field of Classification Search
CPC ............................................... C12N 15/8271
See application file for complete search history.

(56) References Cited

U.S. PATENT DOCUMENTS 10,370,675 B2 * 8/2019 Rea ................ C12Y 203/02015
11,213,004 B2 1/2022 Bovet et al.

FOREIGN PATENT DOCUMENTS

CN 105385701 A 3/2016
KR 10-2018-0107123 A 10/2018

OTHER PUBLICATIONS

Larsson et al Journal of Experimental Botany vol. 52, No. 368 pp. 447-453 (Year: 2002).*
NCBI Reference Sequence XP_009801957.1 Glutathione gamma-glutamylcysteinyltransferase 1-like isoform X1 Source: Nicotiana sylvestris (Year: 2014).*
NCBI Reference Sequence XP_009594480.1 Glutathione gamma-glutamylcysteinyltransferase 1-like isoform X1 Source: Nicotiana tomentosiformis (Year: 2020).*
Lee et al Plant Biotechnology Reports vol. 9, pp. 107-114 (Year: 2015).*
Byoung Doo Lee, et al., "Tobacco phytochelatin synthase (NtPCS1) plays important roles in cadmium and arsenic tolerance and in early plant development in tobacco", Plant Biotechnol Rep, 2015, pp. 107-114, vol. 9.
Sylwia Wojas, et al., "Overexpression of phytochelatin synthase in tobacco: distinctive effects of AtPCS1 and CePCS genes on plant response to cadmium", Journal of Experimental Botany, 2008, pp. 2205-2219, vol. 59, No. 8.
H.S. Seo, et al., "Mutations of phytochelatin synthase (PCS) genes by CRISPR/Cas9 reduce accumulation of cadmium in tobacco leaves", Coresta Meeting, Agronomy/Phytopathology, 2019, AP 36, 175 pages.
E. Helene Larsson, et al., "Influence of prior Cd2+ exposure on the uptake of Cd2+ and other elements in the phytochelatin-deficient mutant, cad1-3, of *Arabidopsis thaliana*", Journal of Experimental Botany, Mar. 2002, pp. 447-453, vol. 53, No. 368.
Prabhat Kumar Rai, et al., "Molecular mechanisms in phytoremediation of environmental contaminants and prospects of engineered transgenic plants/microbes", Science of the Total Environment, 135858, 2020, pp. 1-24, vol. 705.
S. Clemens, "Toxic metal accumulation, responses to exposure and mechanisms of tolerance in plants", ScienceDirect, Biochimie, Elsevier, 2006, pp. 1707-1719, vol. 88.
S. Karenlampi, et al., "Genetic engineering in the improvement of plants for phytoremediation of metal polluted soils", Environmental Pollution, Elsevier, 2000, pp. 225-231, vol. 107.
International Search Report for PCT/KR2021/011059 dated Nov. 30, 2021 (PCT/ISA/210).
Office Action dated Jul. 14, 2022 issued by the Korean Patent Office in Korean Application No. 10-2020- 0114891.

(Continued)

*Primary Examiner* — David H Kruse
(74) *Attorney, Agent, or Firm* — Sughrue Mion, PLLC

(57) ABSTRACT

Provided are: a plant cell, in which expression or activity of a phytochelatin synthase (PCS) gene or a protein encoded by the PCS gene is reduced as compared with a parent cell; a plant having that has reduced heavy metal absorption, and includes the plant cell; a method of reducing heavy metals in a plant, the method including reducing expression or activity of a PCS gene or a protein encoded by the PCS gene, as compared with a parent cell; a CRISPR-Cas9 recombinant vector including a single guide RNA targeting a PCS gene; and a method of preparing a plant with reduced heavy metals, the method including transforming a plant cell with the recombinant vector.

5 Claims, 9 Drawing Sheets
Specification includes a Sequence Listing.

(56) References Cited

OTHER PUBLICATIONS

Maria De Benedictis et al., "The *Arabidopsis thaliana* Knockout Mutant for Phytochelatin Synthase1 (cad1-3) Is Defective in Callose Deposition, Bacterial Pathogen Defense and Auxin Content, But Shows an Increased Stem Lignification", Frontiers in Plant Science, 2018, vol. 9, Article 19, pp. 1-14 (14 pages total).

* cited by examiner

KB108　　NtHMAαβ　　　　KB108　　NtPCSst

SEQUENCE LISTING

<160> NUMBER OF SEQ ID NOS: 55

<210> SEQ ID NO 1
<211> LENGTH: 21
<212> TYPE: DNA
<213> ORGANISM: Artificial
<220> FEATURE:
<223> OTHER INFORMATION: gRNA S1 sequnce of Vlk_PCS_S

<400> SEQUENCE: 1
aagcgaaatc aacagccgga g                                    21

<210> SEQ ID NO 2
<211> LENGTH: 19
<212> TYPE: DNA
<213> ORGANISM: Artificial
<220> FEATURE:
<223> OTHER INFORMATION: gRNA S2 sequnce of Vlk_PCS_S

<400> SEQUENCE: 2
ggcattcaag accatggaa                                       19

<210> SEQ ID NO 3
<211> LENGTH: 19
<212> TYPE: DNA
<213> ORGANISM: Artificial
<220> FEATURE:
<223> OTHER INFORMATION: gRNA T1 sequnce of Vlk_PCS_T

<400> SEQUENCE: 3
cgagttcttc cgtcgcctc                                       19

<210> SEQ ID NO 4
<211> LENGTH: 19
<212> TYPE: DNA
<213> ORGANISM: Artificial
<220> FEATURE:
<223> OTHER INFORMATION: gRNA T2 sequnce of Vlk_PCS_T

<400> SEQUENCE: 4
ggcattcaag accatagaa                                       19

<210> SEQ ID NO 5

```
<211> LENGTH: 19
<212> TYPE: DNA
<213> ORGANISM: Artificial
<220> FEATURE:
<223> OTHER INFORMATION: gRNA_ST1 sequnce of Vlk_PCS_ST

<400> SEQUENCE: 5
tagaagcgaa atcaacagc                                              19

<210> SEQ ID NO 6
<211> LENGTH: 19
<212> TYPE: DNA
<213> ORGANISM: Artificial
<220> FEATURE:
<223> OTHER INFORMATION: gRNA_ST2 sequnce of Vlk_PCS_ST

<400> SEQUENCE: 6
gccatccaga atggaacaa                                              19

<210> SEQ ID NO 7
<211> LENGTH: 28
<212> TYPE: DNA
<213> ORGANISM: Artificial
<220> FEATURE:
<223> OTHER INFORMATION: F_HMA alpha primer sequence

<400> SEQUENCE: 7
gaaacaaaga agttgagcaa gagctatt                                    28

<210> SEQ ID NO 8
<211> LENGTH: 28
<212> TYPE: DNA
<213> ORGANISM: Artificial
<220> FEATURE:
<223> OTHER INFORMATION: R_HMA alpha primer sequence

<400> SEQUENCE: 8
agccttagtg agatgattta taacacaa                                    28

<210> SEQ ID NO 9
<211> LENGTH: 28
<212> TYPE: DNA
<213> ORGANISM: Artificial
<220> FEATURE:
<223> OTHER INFORMATION: F_HMA beta primer sequence

<400> SEQUENCE: 9
gacacaaaga atctgagcaa gagctatt                                    28

<210> SEQ ID NO 10
<211> LENGTH: 28
<212> TYPE: DNA
<213> ORGANISM: Artificial
<220> FEATURE:
<223> OTHER INFORMATION: R_HMA beta primer sequence

<400> SEQUENCE: 10
agctagagta ggaccacaca ttaattct                                    28

<210> SEQ ID NO 11
<211> LENGTH: 23
<212> TYPE: DNA
<213> ORGANISM: Artificial
<220> FEATURE:
<223> OTHER INFORMATION: F_PCSs primer sequence
```

```
<400> SEQUENCE: 11
aaatggcgat ggcgggtttg tat                                        23

<210> SEQ ID NO 12
<211> LENGTH: 28
<212> TYPE: DNA
<213> ORGANISM: Artificial
<220> FEATURE:
<223> OTHER INFORMATION: R_PCSs primer sequence

<400> SEQUENCE: 12
gtcgggaagg attagaacac aaattcac                                   28

<210> SEQ ID NO 13
<211> LENGTH: 23
<212> TYPE: DNA
<213> ORGANISM: Artificial
<220> FEATURE:
<223> OTHER INFORMATION: F_PCSt primer sequence

<400> SEQUENCE: 13
aatggcgatg gcgggtttat atc                                        23

<210> SEQ ID NO 14
<211> LENGTH: 26
<212> TYPE: DNA
<213> ORGANISM: Artificial
<220> FEATURE:
<223> OTHER INFORMATION: R_PCSt primer sequence

<400> SEQUENCE: 14
agtccggaag gataggaaca cagatt                                     26

<210> SEQ ID NO 15
<211> LENGTH: 20
<212> TYPE: DNA
<213> ORGANISM: Artificial
<220> FEATURE:
<223> OTHER INFORMATION: gRNA_A1 sequnce of Vlk_HMA_A6

<400> SEQUENCE: 15
tctttcttac caatttgttg                                            20

<210> SEQ ID NO 16
<211> LENGTH: 20
<212> TYPE: DNA
<213> ORGANISM: Artificial
<220> FEATURE:
<223> OTHER INFORMATION: gRNA_A2 sequnce of Vlk_HMA_A6

<400> SEQUENCE: 16
tgtttgtaca agcttttaga                                            20

<210> SEQ ID NO 17
<211> LENGTH: 21
<212> TYPE: DNA
<213> ORGANISM: Artificial
<220> FEATURE:
<223> OTHER INFORMATION: gRNA_A3 sequnce of Vlk_HMA_A6

<400> SEQUENCE: 17
atggtaactt caataattat a                                          21

<210> SEQ ID NO 18
```

```
<211> LENGTH: 19
<212> TYPE: DNA
<213> ORGANISM: Artificial
<220> FEATURE:
<223> OTHER INFORMATION: gRNA_A4 of Vlk_HMA_A6

<400> SEQUENCE: 18
aagcaagcat aagagtgaa                                                    19

<210> SEQ ID NO 19
<211> LENGTH: 19
<212> TYPE: DNA
<213> ORGANISM: Artificial
<220> FEATURE:
<223> OTHER INFORMATION: gRNA_A5 sequnce of Vlk_HMA_A6

<400> SEQUENCE: 19
ccacacctct aaaaataat                                                    19

<210> SEQ ID NO 20
<211> LENGTH: 19
<212> TYPE: DNA
<213> ORGANISM: Artificial
<220> FEATURE:
<223> OTHER INFORMATION: gRNA_A6 sequnce of Vlk_HMA_A6

<400> SEQUENCE: 20
tcatataaat tgggacaaa                                                    19

<210> SEQ ID NO 21
<211> LENGTH: 20
<212> TYPE: DNA
<213> ORGANISM: Artificial
<220> FEATURE:
<223> OTHER INFORMATION: gRNA_B1 sequence of Vlk_HMA_B6

<400> SEQUENCE: 21
caatttgttg ctgagaaatg                                                   20

<210> SEQ ID NO 22
<211> LENGTH: 20
<212> TYPE: DNA
<213> ORGANISM: Artificial
<220> FEATURE:
<223> OTHER INFORMATION: gRNA_B2 sequence of Vlk_HMA_B6

<400> SEQUENCE: 22
agtggagaaa agatgaagaa                                                   20

<210> SEQ ID NO 23
<211> LENGTH: 21
<212> TYPE: DNA
<213> ORGANISM: Artificial
<220> FEATURE:
<223> OTHER INFORMATION: gRNA_B3 sequence of Vlk_HMA_B6

<400> SEQUENCE: 23
atggtaacta caataattat a                                                 21

<210> SEQ ID NO 24
<211> LENGTH: 19
<212> TYPE: DNA
<213> ORGANISM: Artificial
<220> FEATURE:
<223> OTHER INFORMATION: gRNA_B4 sequence of Vlk_HMA_B6
```

```
<400> SEQUENCE: 24
aagcaagtat aagagtgaa                                                    19

<210> SEQ ID NO 25
<211> LENGTH: 19
<212> TYPE: DNA
<213> ORGANISM: Artificial
<220> FEATURE:
<223> OTHER INFORMATION: gRNA_B5 sequence of Vlk_HMA_B6

<400> SEQUENCE: 25
gattcctcca attattttt                                                    19

<210> SEQ ID NO 26
<211> LENGTH: 19
<212> TYPE: DNA
<213> ORGANISM: Artificial
<220> FEATURE:
<223> OTHER INFORMATION: gRNA_B6 sequence of Vlk_HMA_B6

<400> SEQUENCE: 26
ccacacccct aaaaataat                                                    19

<210> SEQ ID NO 27
<211> LENGTH: 25
<212> TYPE: DNA
<213> ORGANISM: Artificial
<220> FEATURE:
<223> OTHER INFORMATION: F_C9 primer sequence

<400> SEQUENCE: 27
gaccatcctg gacttcctga agagc                                             25

<210> SEQ ID NO 28
<211> LENGTH: 27
<212> TYPE: DNA
<213> ORGANISM: Artificial
<220> FEATURE:
<223> OTHER INFORMATION: R_C9 primer sequence

<400> SEQUENCE: 28
tgcaggtagt acaggtacag cttctcg                                           27

<210> SEQ ID NO 29
<211> LENGTH: 19
<212> TYPE: DNA
<213> ORGANISM: Artificial
<220> FEATURE:
<223> OTHER INFORMATION: F_35S primer sequence

<400> SEQUENCE: 29
gctcctacaa atgccatca                                                    19

<210> SEQ ID NO 30
<211> LENGTH: 20
<212> TYPE: DNA
<213> ORGANISM: Artificial
<220> FEATURE:
<223> OTHER INFORMATION: R_35S primer sequence

<400> SEQUENCE: 30
gatagtggga ttgtgcgtca                                                   20

<210> SEQ ID NO 31
```

<211> LENGTH: 914
<212> TYPE: DNA
<213> ORGANISM: Artificial
<220> FEATURE:
<223> OTHER INFORMATION: PCSs_gDNA sequence of KB108

<400> SEQUENCE: 31

```
atggcgatgg cgggtttgta tcggcgagtt cttccgtccc ctccggctgt tgatttcgct      60
tctactgaag gaaaggcaag ttttagtgct actcttcctt tcttcccttt gaactgatgg     120
ttgaagacta gggttttagc cgtctttgtt tgttgttctg ttctattttg tcactgatga     180
atatggatta tatcataatg ttttaactct ttgtttacta gctggtacca atttgttaat     240
tggtttggac ttcagaggcg gattcagaat tttaaatctg tagttgtgct ttagtatttt     300
gccacaatgg ttgctaacta gtataagtat atagttaatg aaatacgcga tatctgcaat     360
tcaagctgaa cgtaattgat ttagtagagt cagcaagatc caggtgacca aagtgatcag     420
cagcttgatc tgctactcag ccttagggat tggcctatat gatacatgtt agataattgt     480
ttatcgtaaa ttgaccaatt cgctgtttat cgtaattgtt tgtccagacc ccatagtgag     540
aactgtggcc atggcagact taaaagaaaa tgtgataaaa ggaaatcagg aatctgttct     600
gttttacgtg aacttgtaaa tttcgctgtt cttaagggtt gtagctatt tttgtgcttt      660
ccacatgaag catctgactt tcattttgta ctgattttta tgtgtttttt tggagctgca     720
gcaacttttc ttggaggcca tccagaatgg aacaatggaa ggattttttca agttgatctc   780
ttattttcag acacagtctg aaccggccta ttgtggtttg gctagccttt ccatggtctt     840
gaatgccctt gctattgatc caggaagaaa atggaaaggt aattctacta tcatcaagtg     900
aatttgtgtt ctaa                                                        914
```

<210> SEQ ID NO 32
<211> LENGTH: 233
<212> TYPE: DNA
<213> ORGANISM: Artificial
<220> FEATURE:
<223> OTHER INFORMATION: PCSs_CDS sequence of KB108

<400> SEQUENCE: 32

```
atggcgatgg cgggtttgta tcggcgagtt cttccgtccc ctccggctgt tgatttcgct      60
tctactgaag gaaagcaact tttcttggag gccatccaga atggaacaat ggaaggattt     120
tcaagttga tctcttattt tcagacacag tctgaaccgg cctattgtgg tttggctagc      180
ctttccatgg tcttgaatgc ccttgctatt gatccaggaa gaaatggaa agg             233
```

<210> SEQ ID NO 33
<211> LENGTH: 77
<212> TYPE: PRT
<213> ORGANISM: Artificial
<220> FEATURE:
<223> OTHER INFORMATION: PCSs_amino acid sequence of KB108

<400> SEQUENCE: 33

```
Met Ala Met Ala Gly Leu Tyr Arg Arg Val Leu Pro Ser Pro Pro Ala
1               5                   10                  15

Val Asp Phe Ala Ser Thr Glu Gly Lys Gln Leu Phe Leu Glu Ala Ile
            20                  25                  30

Gln Asn Gly Thr Met Glu Gly Phe Phe Lys Leu Ile Ser Tyr Phe Gln
        35                  40                  45

Thr Gln Ser Glu Pro Ala Tyr Cys Gly Leu Ala Ser Leu Ser Met Val
    50                  55                  60
```

Leu Asn Ala Leu Ala Ile Asp Pro Gly Arg Lys Trp Lys
65                  70                  75

<210> SEQ ID NO 34
<211> LENGTH: 6901
<212> TYPE: DNA
<213> ORGANISM: Artificial
<220> FEATURE:
<223> OTHER INFORMATION: PCSt_gDNA sequence of KB108

<400> SEQUENCE: 34

| | | | | | |
|---|---|---|---|---|---|
| atggcgatgg | cgggtttata | tcggcgagtt | cttccgtcgc | ctccggctgt | tgatttcgct | 60 |
| tctactgaag | gaaaggcaag | ttttagtgct | actctttcct | ttttcgtttg | tgctgagggt | 120 |
| taaagactag | ggttttagcc | gtctttggtt | gttgttctat | tttgtcacgg | atgaatatgg | 180 |
| attatatcat | aatcttttag | ctatctgttt | actagctggt | accgatttgt | taattggttt | 240 |
| ggactttatt | cagaattttg | aatctgtaat | tgtgtcgtta | ctatttggcc | acaatggttg | 300 |
| ctaacttagt | ataagtatat | atattattaa | aataattaaa | ctgtgtctgt | aattcagctg | 360 |
| aaggcaattg | atttaataga | gtcagcaaga | tccaggtgac | cacagtgatc | aacaacttga | 420 |
| tcagctggtc | agccttaggg | attggcctat | atgatacacg | ttagataatt | gtttattgta | 480 |
| agttgattta | gacaccaatt | cactgctaac | tgtccagacc | ccataacata | tagtaccttt | 540 |
| tattcaaatt | tgtccttgat | gttccacatg | agaactttg | gccatggcag | tcttaaaaga | 600 |
| aaatgtgata | aaaggaaatc | aggaatctgt | ttcttttga | cgcggacttg | taaattttgc | 660 |
| tgttcttaag | gttttgtagc | tattttttgtg | cttttccacat | tggagggcat | ctgactttca | 720 |
| taaattctac | tccttcctgc | ttcaatgttt | tgttgatata | tttatttatg | atgtacgata | 780 |
| tttttttttt | ggcaattaac | tgtcggtgtc | tttgtctgta | cttacttta | catctacact | 840 |
| ttttaagtct | taacatccca | tttcttgcgg | tatgccctta | acttccagat | actaaaatgt | 900 |
| gtgataaat | tctagtttat | tgtacttgct | tgcccttggt | ttaggtatca | attcatctta | 960 |
| ttgttcggtt | cgactgttaa | ggtgtacatc | tgaagttgat | gtcattgtac | agcctaatac | 1020 |
| agatttgctt | gaatatcttt | tttctccagt | ttgatgctgt | ttcatgaaat | taaaatcctt | 1080 |
| tttgtcatta | atatgaagag | attgaatgca | gttttctctg | gctcttttcca | tacataattt | 1140 |
| tttatgcgta | tctttttatt | aaaaaaagtt | gtcacataag | attttgactt | tccattgaag | 1200 |
| ttgaccttca | gagaggaata | gagaaaagga | gttatattaa | agtatccaag | taaacatatg | 1260 |
| cttgacatca | ttcatattct | ttttactctt | ctacatatct | acagggatgg | aatactcagg | 1320 |
| ccattaagtc | tattacaatt | gcgccaatac | tctttatttc | caagaactta | ataagctttt | 1380 |
| tgtgccgaat | tgctacagtg | acatttcccc | cttcaacttc | tgcacttgat | tgaaggatga | 1440 |
| cttttgcctg | ccatatgtaa | aatgatatta | atacgagatt | aatgagttac | cttttcccct | 1500 |
| ataggtcaaa | gcgagaagag | ctgcattcct | catttgcagc | cacagcctca | ttgaggcaca | 1560 |
| tccctttgac | tccttaccag | cccaaacaac | catatgctgc | ttagctcaat | tccatctgcc | 1620 |
| ttcagttaaa | ttttctgctc | agactagcca | tacccaattc | aaatgttgag | caactattta | 1680 |
| ttagtctatc | acattgtagc | cttataccta | caatgaatac | tcaacataat | aatactcctt | 1740 |
| ggacgactgc | tggtttcctc | tgcagatttt | tatctatgcc | ctcccttcag | atcacttgtc | 1800 |
| tggatccttg | gctcctccca | cccctttaagt | tatgtcatta | tggaagttga | atctttttaat | 1860 |
| ggggaaagct | ctcagttatt | actgcaacca | ttatcttaag | gatctgtttc | ggtttgcttt | 1920 |
| ctcactgatt | gcctgagttt | gatcatattg | gtttatgata | ggcttcctag | ctgaaaaagg | 1980 |

```
ggtagctgtc cctttccttt ttttcccaca atatttcact aggctactgt ggtatcgtat    2040
ggagaacatt gtagcttctc ttagactgag aaactataag aagataggtg tgccagtgac    2100
cgtgtatttg tgcagtgttt tgaatttcat aggaaacaat gttatttagg gagatcctta    2160 acttttcgg aaaaggttaa gtgacccttg cataaacctg gaatttgaag gtctgtctta     2220
cagagatacc tcaaatgccc gcctgatcaa atacaagcca ttcctacatt tatcttgaaa    2280
tgatactatt agatatcaaa ctaagtcttt tgttatatga actgaatgtt atatcaaaaa    2340
taaatttctt ctgtaaacat gaatttgttt tcatcagcat agactgcgtt ttaattagcc    2400
atacctcaga gaaaaaagga aatgcatgaa acggggtgga gggatgagaa agagatacaa    2460
tatctgatac tttgttcagt gactgttctt tttgtactga ttttgcgtg ttttttggag     2520 ctgcagcaac ttttttttgga ggccatccag aatggaacaa tggaaggatt ttcaagttg    2580 atctcttatt ttcagacaca gtctgaaccg gcctattgtg gtttggctag cctttctatg    2640
gtcttgaatg cccttgctat tgatccagga agaaaatgga aaggtaactc tgctatcatc    2700
aagtgaatct gtgttcctat ccttccggac tatatcgatg attttgatct tcactttttc    2760
atggccttgc cttctgaatt gttaataagg tctcaggctc tttatatgtt tatttccttg    2820
atgaaggtct ttacatcttt attttccaat aatttcgcct atcccgacct gcccatgtta    2880
gttataagat atagcacaga gatgtgtagt tcactttgtt ttttattgtt gagatctcta    2940
ttaaaaaaaa taagttgatg ccttgtctgt gagctttgta agttaatctg atatgttgtg    3000
atgcattggc atgagtctga tatcatctgt tctcaacatg aatcctagcc actgttgctg    3060
gacaccttcc aaagatctaa actgctatat gtgcaactta atatttttc ttacctcatt     3120 tattgaaggt gtttattctc tggataattg ttcatcaaag ttgccgttct agtgcagttt    3180
tgcaaactta aggctttaac agattagacc tcggtaatat aattctgaga actcctttag    3240
agttaatatc tgtgtctgta tttcgttcca tttgcattta acagaaaagg gttcatgcat    3300
ctaggagctg ttgctctgag ttgcctcatg catattattt gttgatgtcc attttccaa     3360 acttcatggt cacatgaaat cattcttatt gtcagtttct gtttccaatt tacatgaact    3420
agaaacatct tagataatat tttgtttcaa tgttcacatc ttaaaaactt gaaaaccttt    3480
tctttccacc aattaactta tatgttaggg tcatatcttg gtcaccaatg tctactgata    3540
ttaaagagtc agtttggaaa agaaggagct tggtgaggac agctttaacg ttcttagctt    3600
tcatcacctg aaactgtttg atgcttgtac gtttctcttt cgaacttggt tgttcatatc    3660 cttttatag tctgcttgcg tcaatgagct tggagtttat tatcttatca gcttcaacaa     3720
actgtcaggg ccttggagat ggtttgatga atctatgttg gactgttgtg agcctctgga    3780
gaaggttaaa gctaaaggga tctcttttgg gaaagtggta tgtttggctc actgtgcagg    3840
agcgaaggta gaagcttttc gctctaatca tagtactatt gatgacttcc gtaaacaagt    3900
catggcctgc actactagtg ataattgtca tctgatctca tcatatcata gaggcctttt    3960
taagcaggta aatgtaaaca tagcttctct atccccatgc ttatgattgt gaagaagtat    4020
attgctgcat cgggagtttg accacacagg atctactgaa tcttatggca gacaggttcg    4080
ggccactttt cgcctattgg tggttatcac gtgggaaagg atatggcact gattctagat    4140
gttgcgaggt ttaaatatcc tcctcattgg gttcccctcc ctctcctttg ggaagccatg    4200
aacacaattg atgaagctac aggattacat aggggggtatg cacttccagt tagctgtgct   4260
gtgatattga tattgatttt cataatggct atgagttgtt gcctgttagc atgctcttta    4320
```

```
ccttgaacag cgtctcgttc atgcttttta gctgtcaact gatactggct aagcatttag    4380
cttaaggaat ataaatatgt agaagaagta gttttactat gtgttttggt cttcctctta    4440
taattaagac taaaattgga aattaaatgc tgaactcttt cggcactgct tctggtcttc    4500
ttcaaacata actgtagatt ctcttcatta ttttctcttc ctattctcct tctgctcaaa    4560
tttagcggtc cgtctatatc catctcacac ttgatatatt tttatcattc tgcagcatgg    4620
atttcagtga cttatgtgca aaacataat tttcaggttt atgctaatta ctaagcttca     4680
cagagctcct gcactgctat atacctggt aaggtttaag tagctgctat tatgttattc     4740
gctttaaata taaactcctt cgaagttcga acaaactata agaagcaact tctattactg    4800
cttgtgagat cctttgctag ttgattcttt tcagtacacc agcttggtcg atagttgtt    4860
aactactact ttacctacct tttacatgct ataacataat gataacatct tgtcaaatg    4920
cttgggaatt gtggtcttag tgccaggtga ttagcttgga cttttgtttc aaaactatga    4980
tgtcattgca atatttatgg agtttaacaa cattggcctt tagaactatt taacgtgtaa    5040
ttttttatgt aaattttcta taataaagag ggaggaatgt actgtattga attactcctg    5100
gattttcttc tttctgcgac tagtcatgta ttttgaatgg tgaacttcta cagagctgta    5160
aacatgagag ttgggtcact atctcaaagc atttgatgga tgatcttcct gtcctgttaa    5220
gttctgagaa tgtgaagggc ataaagatg ttctctctac tgttcttta aatctacctt      5280
caaattttgt tgaattcata aagtggatag cggaagttcg aaggcaagag gagaatggtc    5340
aaaatttgag tgacgaggag aaaggaaggc tagctatcaa ggtaaggtat ctgaagaaat    5400
ttagtaaata gaaagaaaaa aagaaggct cctagaaatg gtcatgtaga tttgatcggg     5460
taacttgcag ataggtgat tatttatgag ttcagtaacc actcttacct tactttgcag     5520
gaagaggtat tgaaacaagt gcaggacact cctctttata agcatgtcac aagcatttta    5580
ttttcaaaaa attctatctg ccagtcaaaa gcagcatcag acagcagttt ggctaatgtt    5640
gccgcaaaca tttgctgcca aggagcaggt ctttttgcag gaagatctgg ttcatcggat   5700
aggttttgct gtctccaaac atgtgttaga tgctacagag ctaccggggg caattctgct    5760
acagtggtgt ctgggacagt tgtaaatggg aatggggagc agggggttga tgttctggtc    5820
cctacatctc tagcaaagac tagctgctgt ccctcagggc aagctggttg ctcgccaatg    5880
cacccctgcaa gtaacgatgt gctgacagca ctattgctgg cattacctcc acatacatgg    5940
tctcgaataa aagatacgaa ggtcttgcag gaaatagaga accttgtctc agcagagaac    6000
ctgcctcctt tgctgcaaga agaggtatct ttgtacattt gtctcttatc acatttgctt    6060
tcttgtttta aaattcctct tgttgtttg tgttgggaag cccagaactg gaggattgca     6120
gtaggttaag ggccagcaga aagctaggca attttatgat taatctaaca atattgaaat    6180
attggaaaga aaggagtcca aatagagtta aatggatgtc caggatttat atagcgaccc    6240
caactagctt aggattgagg cttttgtttt gttgttgtca ttttgtattg ggaaattcac    6300
atgagcactt agaatggcct tcataactat atcagagctt ctacctctt ttctaattgg     6360
tagttcttat tatggcccaa tagaagattt ttcctgccta agattatcta tttcactgca   6420
ctgcatattt tatgaaaaat agtctaatcc tcttgaagca ggttatcata tcataacagg    6480
cttaactgat ttttcatttc tagtctatct gaaggagcat ataactgata aatcttatgc    6540
ataatgagac ctaaggcgca taactctgtc ttctgcatgt tattcagccg tttaatgagt    6600
ttgtctctca tgctatgcat cttttgaccaa ttaacttagt tcaacggtat gagttatgaa    6660
attctgagat gtgtgctggg ttgatgaact agtagatacg ctctgagaat gcattttgtt    6720
```

```
ctaatgacta cttaaatctt tcacttggtt aaccattaaa catggtgtaa tatacttctg    6780
aatatccttt tgggcgactg cagattttgc acctgcgagg acagttcctc ctcctcaaga    6840
aatgcaagga taacaaggta gaagaagatt tagctgcacc tcccttctag ctttgctttc    6900
c                                                                    6901
```

<210> SEQ ID NO 35
<211> LENGTH: 1506
<212> TYPE: DNA
<213> ORGANISM: Artificial
<220> FEATURE:
<223> OTHER INFORMATION: PCSt_CDS sequence of KB108

<400> SEQUENCE: 35

```
atggcgatgg cgggtttata tcggcgagtt cttccgtcgc ctccggctgt tgatttcgct      60
tctactgaag gaaagcaact ttttttggag gccatccaga atggaacaat ggaaggattt     120
ttcaagttga tctcttattt tcagacacag tctgaaccgg cctattgtgg tttggctagc     180
cttttctatg gtcttgaatg ccttgctatt gatccaggaa gaaaatggaa agggccttgg     240
agatggtttg atgaatctat gttggactgt tgtgagcctc tggagaaggt taaagctaaa     300
gggatctctt ttgggaaagt ggtatgtttg gctcactgtg caggagcgaa ggtagaagct     360
tttcgctcta atcatagtac tattgatgac ttccgtaaac aagtcatggc ctgcactact     420
agtgataatt gtcatctgat ctcatcatat catagaggcc tttttaagca gacaggttcg     480
ggccactttt cgcctattgg tggttatcac gtgggaaagg atatggcact gattctagat     540
gttgcgaggt ttaaatatcc tcctcattgg gttcccctcc ctctcctttg ggaagccatg     600
aacacaattg atgaagctac aggattacat aggggtttta tgctaattac taagcttcac     660
agagctcctg cactgctata taccctgagc tgtaaacatg agagttgggt cactatctca     720
aagcatttga tggatgatct tcctgtcctg ttaagttctg agaatgtgaa gggcataaaa     780
gatgttctct ctactgttct ttcaaatcta ccttcaaatt ttgttgaatt cataaagtgg     840
atagcggaag ttcgaaggca agaggagaat ggtcaaaatt tgagtgacga ggagaaagga     900
aggctagcta tcaaggaaga ggtattgaaa caagtgcagg acactcctct ttataagcat     960
gtcacaagca ttttatttc aaaaaattct atctgccagt caaaagcagc atcagacagc    1020
agtttggcta atgttgccgc aaacatttgc tgccaaggag caggtctttt tgcaggaaga    1080
tctggttcat cggataggtt ttgctgtctc caaacatgtg ttagatgcta cagagctacc    1140
gggggcaatt ctgctacagt ggtgtctggg acagttgtaa atgggaatgg ggagcagggg    1200
gttgatgttc tggtccctac atctctagca aagactagct gctgtccctc agggcaagct    1260
ggttgctcgc caatgcaccc tgcaagtaac gatgtgctga cagcactatt gctggcatta    1320
cctccacata catggtctcg aataaaagat acgaaggtct gcaggaaat agagaacctt    1380 gtctcagcag agaacctgcc tcctttgctg caagaagaga ttttgcacct gcgaggacag    1440
ttcctcctcc tcaagaaatg caaggataac aaggtagaag aagatttagc tgcacctccc    1500
ttctag                                                              1506
```

<210> SEQ ID NO 36
<211> LENGTH: 501
<212> TYPE: PRT
<213> ORGANISM: Artificial
<220> FEATURE:
<223> OTHER INFORMATION: PCSt_amino acid sequence of KB108

-continued

```
<400> SEQUENCE: 36

Met Ala Met Ala Gly Leu Tyr Arg Arg Val Leu Pro Ser Pro Pro Ala
1               5                   10                  15

Val Asp Phe Ala Ser Thr Glu Gly Lys Gln Leu Phe Leu Glu Ala Ile
            20                  25                  30

Gln Asn Gly Thr Met Glu Gly Phe Lys Leu Ile Ser Tyr Phe Gln
        35                  40                  45

Thr Gln Ser Glu Pro Ala Tyr Cys Gly Leu Ala Ser Leu Ser Met Val
    50                  55                  60

Leu Asn Ala Leu Ala Ile Asp Pro Gly Arg Lys Trp Lys Gly Pro Trp
65                  70                  75                  80

Arg Trp Phe Asp Glu Ser Met Leu Asp Cys Cys Glu Pro Leu Glu Lys
                85                  90                  95

Val Lys Ala Lys Gly Ile Ser Phe Gly Lys Val Val Cys Leu Ala His
            100                 105                 110

Cys Ala Gly Ala Lys Val Glu Ala Phe Arg Ser Asn His Ser Thr Ile
        115                 120                 125

Asp Asp Phe Arg Lys Gln Val Met Ala Cys Thr Thr Ser Asp Asn Cys
    130                 135                 140

His Leu Ile Ser Ser Tyr His Arg Gly Leu Phe Lys Gln Thr Gly Ser
145                 150                 155                 160

Gly His Phe Ser Pro Ile Gly Gly Tyr His Val Gly Lys Asp Met Ala
                165                 170                 175

Leu Ile Leu Asp Val Ala Arg Phe Lys Tyr Pro Pro His Trp Val Pro
            180                 185                 190

Leu Pro Leu Leu Trp Glu Ala Met Asn Thr Ile Asp Glu Ala Thr Gly
        195                 200                 205

Leu His Arg Gly Phe Met Leu Ile Thr Lys Leu His Arg Ala Pro Ala
    210                 215                 220

Leu Leu Tyr Thr Leu Ser Cys Lys His Glu Ser Trp Val Thr Ile Ser
225                 230                 235                 240

Lys His Leu Met Asp Asp Leu Pro Val Leu Leu Ser Ser Glu Asn Val
                245                 250                 255

Lys Gly Ile Lys Asp Val Leu Ser Thr Val Leu Ser Asn Leu Pro Ser
            260                 265                 270

Asn Phe Val Glu Phe Ile Lys Trp Ile Ala Glu Val Arg Arg Gln Glu
        275                 280                 285

Glu Asn Gly Gln Asn Leu Ser Asp Glu Glu Lys Gly Arg Leu Ala Ile
    290                 295                 300

Lys Glu Glu Val Leu Lys Gln Val Gln Asp Thr Pro Leu Tyr Lys His
305                 310                 315                 320

Val Thr Ser Ile Leu Phe Ser Lys Asn Ser Ile Cys Gln Ser Lys Ala
                325                 330                 335

Ala Ser Asp Ser Ser Leu Ala Asn Val Ala Asn Ile Cys Cys Gln
            340                 345                 350

Gly Ala Gly Leu Phe Ala Gly Arg Ser Gly Ser Ser Asp Arg Phe Cys
        355                 360                 365

Cys Leu Gln Thr Cys Val Arg Cys Tyr Arg Ala Thr Gly Gly Asn Ser
    370                 375                 380

Ala Thr Val Val Ser Gly Thr Val Val Asn Gly Asn Gly Glu Gln Gly
385                 390                 395                 400

Val Asp Val Leu Val Pro Thr Ser Leu Ala Lys Thr Ser Cys Cys Pro
                405                 410                 415
```

Ser Gly Gln Ala Gly Cys Ser Pro Met His Pro Ala Ser Asn Asp Val
            420                 425                 430

Leu Thr Ala Leu Leu Ala Leu Pro Pro His Thr Trp Ser Arg Ile
            435                 440                 445

Lys Asp Thr Lys Val Leu Gln Glu Ile Glu Asn Leu Val Ser Ala Glu
450                 455                 460

Asn Leu Pro Pro Leu Leu Gln Glu Glu Ile Leu His Leu Arg Gly Gln
465                 470                 475                 480

Phe Leu Leu Leu Lys Lys Cys Lys Asp Asn Lys Val Glu Glu Asp Leu
                485                 490                 495

Ala Ala Pro Pro Phe
            500

<210> SEQ ID NO 37
<211> LENGTH: 915
<212> TYPE: DNA
<213> ORGANISM: Artificial
<220> FEATURE:
<223> OTHER INFORMATION: PCSs_gDNA sequence of PCSst

<400> SEQUENCE: 37
atggcgatgg cgggtttgta tcggcgagtt cttccgtccc ctccggctgt tgatttcgct      60
tctactgaag gaaaggcaag ttttagtgct actcttcctt cttcccttt gaactgatgg     120 ttgaagacta gggtttagc cgtctttgtt tgttgttctg ttctattttg tcactgatga     180
atatggatta tatcataatg ttttaactct ttgtttacta gctggtacca atttgttaat     240
tggtttggac ttcagaggcg gattcagaat tttaaatctg tagttgtgct ttagtatttt     300
gccacaatgg ttgctaacta gtataagtat atagttaatg aaatacgcga tatctgcaat     360
tcaagctgaa cgtaattgat ttagtagagt cagcaagatc caggtgacca aagtgatcag     420
cagcttgatc tgctactcag ccttagggat tggcctatat gatacatgtt agataattgt     480
ttatcgtaaa ttgaccaatt cgctgtttat cgtaattgtt tgtccagacc ccatagtgag     540
aactgtggcc atggcagact taaaagaaaa tgtgataaaa ggaaatcagg aatctgttct     600
gttttacgtg aacttgtaaa tttcgctgtt cttaaggggt tgtagctatt tttgtgcttt     660
ccacatgaag catctgactt tcatttttgta ctgattttta tgtgtttttt tggagctgca     720 gcaactttc ttggaggcca tccagaatgg aaacaatgga aggattttc aagttgatct     780 cttattttca gacacagtct gaaccggcct attgtggttt ggctagcctt tccatggtct     840
tgaatgccct tgctattgat ccaggaagaa aatggaaagg taattctact atcatcaagt     900
gaatttgtgt tctaa                                                     915

<210> SEQ ID NO 38
<211> LENGTH: 234
<212> TYPE: DNA
<213> ORGANISM: Artificial
<220> FEATURE:
<223> OTHER INFORMATION: PCSs_CDS sequence of PCSst

<400> SEQUENCE: 38
atggcgatgg cgggtttgta tcggcgagtt cttccgtccc ctccggctgt tgatttcgct      60
tctactgaag gaaagcaact tttcttggag gccatccaga atggaaacaa tggaaggatt     120
tttcaagttg atctcttatt ttcagacaca gtctgaaccg gcctattgtg gtttggctag     180
cctttccatg gtcttgaatg cccttgctat tgatccagga agaaaatgga aagg           234

```
<210> SEQ ID NO 39
<211> LENGTH: 78
<212> TYPE: PRT
<213> ORGANISM: Artificial
<220> FEATURE:
<223> OTHER INFORMATION: PCSs_amino acid sequence of PCSst
<220> FEATURE:
<221> NAME/KEY: SITE
<222> LOCATION: (52)..(52)
<223> OTHER INFORMATION: X or Xaa is * which is the result of early stop
      codon
<220> FEATURE:
<221> NAME/KEY: misc_feature
<222> LOCATION: (52)..(52)
<223> OTHER INFORMATION: Xaa can be any naturally occurring amino acid
<220> FEATURE:
<221> NAME/KEY: SITE
<222> LOCATION: (60)..(60)
<223> OTHER INFORMATION: X or Xaa is * which is the result of early stop
      codon
<220> FEATURE:
<221> NAME/KEY: misc_feature
<222> LOCATION: (60)..(60)
<223> OTHER INFORMATION: Xaa can be any naturally occurring amino acid
<220> FEATURE:
<221> NAME/KEY: SITE
<222> LOCATION: (71)..(71)
<223> OTHER INFORMATION: X or Xaa is * which is the result of early stop
      codon
<220> FEATURE:
<221> NAME/KEY: misc_feature
<222> LOCATION: (71)..(71)
<223> OTHER INFORMATION: Xaa can be any naturally occurring amino acid

<400> SEQUENCE: 39

Met Ala Met Ala Gly Leu Tyr Arg Arg Val Leu Pro Ser Pro Pro Ala
1               5                   10                  15

Val Asp Phe Ala Ser Thr Glu Gly Lys Gln Leu Phe Leu Glu Ala Ile
            20                  25                  30

Gln Asn Gly Asn Asn Gly Arg Ile Phe Gln Val Asp Leu Leu Phe Ser
        35                  40                  45

Asp Thr Val Xaa Thr Gly Leu Leu Trp Phe Gly Xaa Pro Phe His Gly
    50                  55                  60

Leu Glu Cys Pro Cys Tyr Xaa Ser Arg Lys Lys Met Glu Arg
65                  70                  75

<210> SEQ ID NO 40
<211> LENGTH: 6902
<212> TYPE: DNA
<213> ORGANISM: Artificial
<220> FEATURE:
<223> OTHER INFORMATION: PCSt_gDNA sequence of PCSst

<400> SEQUENCE: 40
atggcgatgg cgggtttata tcggcgagtt cttccgtcgc ctccggctgt tgatttcgct    60
tctactgaag gaaaggcaag ttttagtgct actctttcct ttttcgtttg tgctgagggt   120
taaagactag ggttttagcc gtctttggtt gttgttctat tttgtcacgg atgaatatgg   180
attatatcat aatcttttag ctatctgttt actagctggt accgatttgt taattggttt   240
ggactttatt cagaattttg aatctgtaat tgtgtcgtta ctatttggcc acaatggttg   300
ctaacttagt ataagtatat atattattaa ataattaaa ctgtgtctgt aattcagctg    360
aaggcaattg atttaataga gtcagcaaga tccaggtgac cacagtgatc aacaacttga   420
tcagctggtc agccttaggg attggcctat atgatacacg ttagataatt gtttattgta   480
agttgattta gacaccaatt cactgctaac tgtccagacc ccataacata tagtaccttt   540
```

```
tattcaaatt tgtccttgat gttccacatg gagaactttg gccatggcag tcttaaaaga      600
aaatgtgata aaaggaaatc aggaatctgt ttcttttttga cgcggacttg taaattttgc    660
tgttcttaag gttttgtagc tattttttgtg cttccacat tggagggcat ctgactttca    720
taaattctac tccttcctgc ttcaatgttt tgttgatata tttatttatg atgtacgata   780
tttttttttt ggcaattaac tgtcggtgtc tttgtctgta cttactttta catctacact   840
ttttaagtct taacatccca tttcttgcgg tatgccctta acttccagat actaaaatgt   900
gtgataatat tctagtttat tgtacttgct tgcccttggt ttaggtatca attcatctta   960
ttgttcggtt cgactgttaa ggtgtacatc tgaagttgat gtcattgtac agcctaatac   1020
agatttgctt gaatatcttt tttctccagt ttgatgctgt ttcatgaaat taaaatcctt   1080
tttgtcatta atatgaagag attgaatgca gttttctctg gctctttcca tacataattt   1140
tttatgcgta tctttttatt aaaaaaagtt gtcacataag attttgactt tccattgaag   1200
ttgaccttca gagaggaata gagaaaagga gttatattaa agtatccaag taaacatatg   1260
cttgacatca ttcatattct ttttactctt ctacatatct acagggatgg aatactcagg   1320
ccattaagtc tattacaatt gcgccaatac tctttatttc caagaactta ataagctttt   1380
tgtgccgaat tgctacagtg acattttccc cttcaacttc tgcacttgat tgaaggatga   1440
cttttgcctg ccatatgtaa aatgatatta atacgagatt aatgagttac cttttcccct   1500
ataggtcaaa gcgagaagag ctgcattcct catttgcagc cacagcctca ttgaggcaca   1560
tccctttgac tccttaccag cccaaacaac catatgctgc ttagctcaat tccatctgcc   1620
ttcagttaaa ttttctgctc agactagcca tacccaattc aaatgttgag caactattta   1680
ttagtctatc acattgtagc cttataccct caatgaatac tcaacataat aatactcctt   1740
ggacgactgc tggtttcctc tgcagatttt tatctatgcc ctcccttcag atcacttgtc   1800
tggatccttg gctcctccca cccttttaagt tatgtcatta tggaagttga atctttttaat  1860 ggggaaagct ctcagttatt actgcaacca ttatcttaag gatctgtttc ggtttgcttt   1920
ctcactgatt gcctgagttt gatcatattg gtttatgata ggcttcctag ctgaaaaagg   1980
ggtagctgtc cctttccttt ttttcccaca atatttcact aggctactgt ggtatcgtat   2040
ggagaacatt gtagcttctc ttagactgag aaactataag aagataggtg tgccagtgac   2100
cgtgtatttg tgcagtgttt tgaatttcat aggaaacaat gttatttagg gagatcctta   2160 acttttcgg aaaaggttaa gtgaccttg cataaacctg gaatttgaag gtctgtctta    2220
cagagatacc tcaaatgccc gcctgatcaa atacaagcca ttcctacatt tatcttgaaa   2280
tgatactatt agatatcaaa ctaagtcttt tgttatatga actgaatgtt atatcaaaaa   2340
taaatttctt ctgtaaacat gaatttgttt tcatcagcat agactgcgtt ttaattagcc   2400
atacctcaga gaaaaagga aatgcatgaa acggggtgga gggatgagaa agagatacaa    2460
tatctgatac tttgttcagt gactgttctt tttgtactga ttttttgcgtg tttttttggag  2520 ctgcagcaac tttttttgga ggccatccag aatggaaaca atggaaggat ttttcaagtt   2580
gatctcttat tttcagacac agtctgaacc ggcctattgt ggtttggcta gcctttctat   2640
ggtcttgaat gcccttgcta ttgatccagg aagaaaatgg aaaggtaact ctgctatcat   2700
caagtgaatc tgtgttccta tccttccgga ctatatcgat gattttgatc ttcactttt   2760 catggccttg ccttctgaat tgttaataag gtctcaggct ctttatatgt ttatttcctt   2820
gatgaaggtc tttacatctt tatttttccaa taatttcgcc tatcccgacc tgcccatgtt  2880
```

```
agttataaga tatagcacag agatgtgtag ttcactttgt tttttattgt tgagatctct    2940
attaaaaaaa ataagttgat gccttgtctg tgagctttgt aagttaatct gatatgttgt    3000
gatgcattgg catgagtctg atatcatctg ttctcaacat gaatcctagc cactgttgct    3060
ggacaccttc caaagatcta aactgctata tgtgcaactt aatattttt cttacctcat     3120
ttattgaagg tgtttattct ctggataatt gttcatcaaa gttgccgttc tagtgcagtt    3180
ttgcaaactt aaggctttaa cagattagac ctcggtaata taattctgag aactccttta    3240
gagttaatat ctgtgtctgt atttcgttcc atttgcattt aacagaaaag ggttcatgca    3300
tctaggagct gttgctctga gttgcctcat gcatattatt tgttgatgtc catttttcca    3360
aacttcatgg tcacatgaaa tcattcttat tgtcagtttc tgtttccaat ttacatgaac    3420
tagaaacatc ttagataata ttttgtttca atgttcacat cttaaaaact tgaaaacctt    3480
ttctttccac caattaactt atatgttagg gtcatatctt ggtcaccaat gtctactgat    3540
attaaagagt cagtttggaa agaaggagc ttggtgagga cagctttaac gttcttagct     3600
ttcatcacct gaaactgttt gatgcttgta cgtttctctt tcgaacttgg ttgttcatat    3660
cctttttata gtctgcttgc gtcaatgagc ttggagttta ttatcttatc agcttcaaca    3720
aactgtcagg gccttggaga tggtttgatg aatctatgtt ggactgttgt gagcctctgg    3780
agaaggttaa agctaagg atctcttttg ggaaagtggt atgtttggct cactgtgcag      3840
gagcgaaggt agaagctttt cgctctaatc atagtactat tgatgacttc cgtaaacaag    3900
tcatggcctg cactactagt gataattgtc atctgatctc atcatatcat agaggccttt    3960
ttaagcaggt aaatgtaaac atagcttctc tatccccatg cttatgattg tgaagaagta    4020
tattgctgca tcgggagttt gaccacacag gatctactga atcttatggc agacaggttc    4080
gggccacttt tcgcctattg gtggttatca cgtgggaaag gatatggcac tgattctaga    4140
tgttgcgagg tttaaatatc ctcctcattg ggttcccctc cctctccttt gggaagccat    4200
gaacacaatt gatgaagcta caggattaca taggggtat gcacttccag ttagctgtgc     4260
tgtgatattg atattgattt tcataatggc tatgagttgt tgcctgttag catgctcttt    4320
accttgaaca gcgtctcgtt catgcttttt agctgtcaac tgatactggc taagcattta    4380
gcttaaggaa tataaatatg tagaagaagt agttttacta tgtgttttgg tcttcctctt    4440
ataattaaga ctaaaattgg aaattaaatg ctgaactctt tcggcactgc ttctggtctt    4500
cttcaaacat aactgtagat tctcttcatt attttctctt cctattctcc ttctgctcaa    4560
atttagcggt ccgtctatat ccatctcaca cttgatatat ttttatcatt ctgcagcatg    4620
gatttcagtg acttatgtgc aaaaacataa ttttcaggtt tatgctaatt actaagcttc    4680
acagagctcc tgcactgcta tatacccctgg taaggtttaa gtagctgcta ttatgttatt   4740
cgctttaaat ataaactcct tcgaagttcg aacaaactat aagaagcaac ttctattact    4800
gcttgtgaga tcctttgcta gttgattctt ttcagtacac cagcttggtc ggatagttgt    4860
taactactac tttacctacc ttttacatgc tataacataa tgataacatc tttgtcaaat    4920
gcttgggaat tgtggtctta gtgccaggtg attagcttgg acttttgttt caaaactatg    4980
atgtcattgc aatatttatg gagtttaaca acattggcct ttagaactat ttaacgtgta    5040
attttttatg taaattttct ataataaaga gggaggaatg tactgtattg aattactcct    5100
ggattttctt ctttctgcga ctagtcatgt attttgaatg gtgaacttct acagagctgt    5160
aaacatgaga gttgggtcac tatctcaaag catttgatgg atgatcttcc tgtcctgtta    5220
agttctgaga atgtgaaggg cataaaagat gttctctcta ctgttctttc aaatctacct    5280
```

```
tcaaattttg ttgaattcat aaagtggata gcggaagttc gaaggcaaga ggagaatggt    5340
caaaatttga gtgacgagga gaaaggaagg ctagctatca aggtaaggta tctgaagaaa    5400
tttagtaaat agaaagaaaa aaagaaggc tcctagaaat ggtcatgtag atttgatcgg     5460
gtaacttgca ggataggtga ttatttatga gttcagtaac cactcttacc ttactttgca    5520
ggaagaggta ttgaaacaag tgcaggacac tcctctttat aagcatgtca caagcatttt    5580
attttcaaaa aattctatct gccagtcaaa agcagcatca gacagcagtt tggctaatgt    5640
tgccgcaaac atttgctgcc aaggagcagg tcttttttgca ggaagatctg gttcatcgga   5700
taggttttgc tgtctccaaa catgtgttag atgctacaga gctaccgggg caattctgc    5760 tacagtggtg tctgggacag ttgtaaatgg gaatggggag caggggttg atgttctggt     5820 ccctacatct ctagcaaaga ctagctgctg tccctcaggg caagctggtt gctcgccaat    5880
gcaccctgca agtaacgatg tgctgacagc actattgctg gcattacctc cacatacatg    5940
gtctcgaata aagatacga aggtcttgca ggaaatagag aaccttgtct cagcagagaa     6000
cctgcctcct ttgctgcaag aagaggtatc tttgtacatt tgtctcttat cacatttgct    6060
ttcttgtttt aaaattcctc tttgttgttt gtgttgggaa gcccagaact ggaggattgc    6120
agtaggttaa gggccagcag aaagctaggc aattttatga ttaatctaac aatattgaaa   6180
tattggaaag aaaggagtcc aaatagagtt aaatggatgt ccaggattta tagcgacc     6240 ccaactagct taggattgag gcttttgttt tgttgttgtc attttgtatt gggaaattca   6300
catgagcact tagaatggcc ttcataacta tatcagagct ttctacctct tttctaattg    6360
gtagttctta ttatggccca atagaagatt tttcctgcct aagattatct atttcactgc    6420
actgcatatt ttatgaaaaa tagtctaatc ctcttgaagc aggttatcat atcataacag    6480
gcttaactga tttttcatt ctagtctatc tgaaggagca tataactgat aaatcttatg     6540
cataatgaga cctaaggcgc ataactctgt cttctgcatg ttattcagcc gtttaatgag    6600
tttgtctctc atgctatgca tctttgacca attaacttag ttcaacggta tgagttatga    6660
aattctgaga tgtgtgctgg gttgatgaac tagtagatac gctctgagaa tgcattttgt    6720
tctaatgact acttaaatct ttcacttggt taaccattaa acatggtgta atatacttct    6780
gaatatcctt ttgggcgact gcagattttg cacctgcgag gacagttcct cctcctcaag    6840
aaatgcaagg ataacaaggt agaagaagat ttagctgcac ctcccttcta gctttgcttt    6900
cc                                                                   6902
```

<210> SEQ ID NO 41
<211> LENGTH: 1507
<212> TYPE: DNA
<213> ORGANISM: Artificial
<220> FEATURE:
<223> OTHER INFORMATION: PCSt_CDS sequence of PCSst

<400> SEQUENCE: 41

```
atggcgatgg cgggtttata tcggcgagtt cttccgtcgc ctccggctgt tgatttcgct     60
tctactgaag gaaagcaact ttttttggag gccatccaga atggaaacaa tggaaggatt    120
tttcaagttg atctcttatt ttcagacaca gtctgaaccg gcctattgtg gtttggctag   180 ccttttctatg gtcttgaatg cccttgctat tgatccagga agaaaatgga aagggccttg   240
gagatggttt tgatgaatcta tgttggactg ttgtgagcct ctggagaagg ttaaagctaa   300
agggatctct tttgggaaag tggtatgttt ggctcactgt gcaggagcga aggtagaagc    360
```

-continued

```
ttttcgctct aatcatagta ctattgatga cttccgtaaa caagtcatgg cctgcactac    420
tagtgataat tgtcatctga tctcatcata tcatagaggc cttttttaagc agacaggttc    480
gggccacttt tcgcctattg gtggttatca cgtgggaaag gatatggcac tgattctaga    540
tgttgcgagg tttaaatatc ctcctcattg ggttcccctc cctctccttt gggaagccat    600
gaacacaatt gatgaagcta caggattaca tagggggttt atgctaatta ctaagcttca    660
cagagctcct gcactgctat ataccctgag ctgtaaacat gagagttggg tcactatctc    720
aaagcatttg atggatgatc ttcctgtcct gttaagttct gagaatgtga agggcataaa    780
agatgttctc tctactgttc tttcaaatct accttcaaat tttgttgaat tcataaagtg    840
gatagcggaa gttcgaaggc aagaggagaa tggtcaaaat ttgagtgacg aggagaaagg    900
aaggctagct atcaaggaag aggtattgaa acaagtgcag acactcctc tttataagca     960
tgtcacaagc atttattttt caaaaaattc tatctgccag tcaaaagcag catcagacag   1020
cagtttggct aatgttgccg caaacatttg ctgccaagga gcaggtcttt ttgcaggaag   1080
atctggttca tcggataggt tttgctgtct ccaaacatgt gttagatgct acagagctac   1140
cgggggcaat tctgctacag tggtgtctgg gacagttgta aatgggaatg gggagcaggg   1200
ggttgatgtt ctggtcccta catctctagc aaagactagc tgctgtccct cagggcaagc   1260
tggttgctcg ccaatgcacc ctgcaagtaa cgatgtgctg acagcactat tgctggcatt   1320
acctccacat acatggtctc gaataaaaga tacgaaggtc ttgcaggaaa tagagaacct   1380
tgtctcagca gagaacctgc ctcctttgct gcaagaagag attttgcacc tgcgaggaca   1440
gttcctcctc ctcaagaaat gcaaggataa caaggtagaa gaagatttag ctgcacctcc   1500
cttctag                                                             1507
```

<210> SEQ ID NO 42
<211> LENGTH: 502
<212> TYPE: PRT
<213> ORGANISM: Artificial
<220> FEATURE:
<223> OTHER INFORMATION: PCSt_amino acid sequence of PCSst
<220> FEATURE:
<221> NAME/KEY: SITE
<222> LOCATION: (52)..(52)
<223> OTHER INFORMATION: X or Xaa is * which is the result of early stop codon
<220> FEATURE:
<221> NAME/KEY: misc_feature
<222> LOCATION: (52)..(52)
<223> OTHER INFORMATION: Xaa can be any naturally occurring amino acid
<220> FEATURE:
<221> NAME/KEY: SITE
<222> LOCATION: (60)..(60)
<223> OTHER INFORMATION: X or Xaa is * which is the result of early stop codon
<220> FEATURE:
<221> NAME/KEY: misc_feature
<222> LOCATION: (60)..(60)
<223> OTHER INFORMATION: Xaa can be any naturally occurring amino acid
<220> FEATURE:
<221> NAME/KEY: SITE
<222> LOCATION: (71)..(71)
<223> OTHER INFORMATION: X or Xaa is * which is the result of early stop codon
<220> FEATURE:
<221> NAME/KEY: misc_feature
<222> LOCATION: (71)..(71)
<223> OTHER INFORMATION: Xaa can be any naturally occurring amino acid
<220> FEATURE:
<221> NAME/KEY: SITE
<222> LOCATION: (84)..(85)
<223> OTHER INFORMATION: X or Xaa is * which is the result of early stop codon

```
<220> FEATURE:
<221> NAME/KEY: misc_feature
<222> LOCATION: (84)..(85)
<223> OTHER INFORMATION: Xaa can be any naturally occurring amino acid
<220> FEATURE:
<221> NAME/KEY: SITE
<222> LOCATION: (92)..(92)
<223> OTHER INFORMATION: X or Xaa is * which is the result of early stop
      codon
<220> FEATURE:
<221> NAME/KEY: misc_feature
<222> LOCATION: (92)..(92)
<223> OTHER INFORMATION: Xaa can be any naturally occurring amino acid
<220> FEATURE:
<221> NAME/KEY: SITE
<222> LOCATION: (98)..(98)
<223> OTHER INFORMATION: X or Xaa is * which is the result of early stop
      codon
<220> FEATURE:
<221> NAME/KEY: misc_feature
<222> LOCATION: (98)..(98)
<223> OTHER INFORMATION: Xaa can be any naturally occurring amino acid
<220> FEATURE:
<221> NAME/KEY: SITE
<222> LOCATION: (100)..(100)
<223> OTHER INFORMATION: X or Xaa is * which is the result of early stop
      codon
<220> FEATURE:
<221> NAME/KEY: misc_feature
<222> LOCATION: (100)..(100)
<223> OTHER INFORMATION: Xaa can be any naturally occurring amino acid
<220> FEATURE:
<221> NAME/KEY: SITE
<222> LOCATION: (124)..(124)
<223> OTHER INFORMATION: X or Xaa is * which is the result of early stop
      codon
<220> FEATURE:
<221> NAME/KEY: misc_feature
<222> LOCATION: (124)..(124)
<223> OTHER INFORMATION: Xaa can be any naturally occurring amino acid
<220> FEATURE:
<221> NAME/KEY: SITE
<222> LOCATION: (126)..(126)
<223> OTHER INFORMATION: X or Xaa is * which is the result of early stop
      codon
<220> FEATURE:
<221> NAME/KEY: misc_feature
<222> LOCATION: (126)..(126)
<223> OTHER INFORMATION: Xaa can be any naturally occurring amino acid
<220> FEATURE:
<221> NAME/KEY: SITE
<222> LOCATION: (129)..(130)
<223> OTHER INFORMATION: X or Xaa is * which is the result of early stop
      codon
<220> FEATURE:
<221> NAME/KEY: misc_feature
<222> LOCATION: (129)..(130)
<223> OTHER INFORMATION: Xaa can be any naturally occurring amino acid
<220> FEATURE:
<221> NAME/KEY: SITE
<222> LOCATION: (133)..(133)
<223> OTHER INFORMATION: X or Xaa is * which is the result of early stop
      codon
<220> FEATURE:
<221> NAME/KEY: misc_feature
<222> LOCATION: (133)..(133)
<223> OTHER INFORMATION: Xaa can be any naturally occurring amino acid
<220> FEATURE:
<221> NAME/KEY: SITE
<222> LOCATION: (141)..(143)
<223> OTHER INFORMATION: X or Xaa is * which is the result of early stop
      codon
<220> FEATURE:
<221> NAME/KEY: misc_feature
<222> LOCATION: (141)..(143)
<223> OTHER INFORMATION: Xaa can be any naturally occurring amino acid
<220> FEATURE:
<221> NAME/KEY: SITE
<222> LOCATION: (152)..(152)
```

```
<223> OTHER INFORMATION: X or Xaa is * which is the result of early stop
      codon
<220> FEATURE:
<221> NAME/KEY: misc_feature
<222> LOCATION: (152)..(152)
<223> OTHER INFORMATION: Xaa can be any naturally occurring amino acid
<220> FEATURE:
<221> NAME/KEY: SITE
<222> LOCATION: (156)..(156)
<223> OTHER INFORMATION: X or Xaa is * which is the result of early stop
      codon
<220> FEATURE:
<221> NAME/KEY: misc_feature
<222> LOCATION: (156)..(156)
<223> OTHER INFORMATION: Xaa can be any naturally occurring amino acid
<220> FEATURE:
<221> NAME/KEY: SITE
<222> LOCATION: (185)..(185)
<223> OTHER INFORMATION: X or Xaa is * which is the result of early stop
      codon
<220> FEATURE:
<221> NAME/KEY: misc_feature
<222> LOCATION: (185)..(185)
<223> OTHER INFORMATION: Xaa can be any naturally occurring amino acid
<220> FEATURE:
<221> NAME/KEY: SITE
<222> LOCATION: (204)..(205)
<223> OTHER INFORMATION: X or Xaa is * which is the result of early stop
      codon
<220> FEATURE:
<221> NAME/KEY: misc_feature
<222> LOCATION: (204)..(205)
<223> OTHER INFORMATION: Xaa can be any naturally occurring amino acid
<220> FEATURE:
<221> NAME/KEY: SITE
<222> LOCATION: (211)..(211)
<223> OTHER INFORMATION: X or Xaa is * which is the result of early stop
      codon
<220> FEATURE:
<221> NAME/KEY: misc_feature
<222> LOCATION: (211)..(211)
<223> OTHER INFORMATION: Xaa can be any naturally occurring amino acid
<220> FEATURE:
<221> NAME/KEY: SITE
<222> LOCATION: (218)..(218)
<223> OTHER INFORMATION: X or Xaa is * which is the result of early stop
      codon
<220> FEATURE:
<221> NAME/KEY: misc_feature
<222> LOCATION: (218)..(218)
<223> OTHER INFORMATION: Xaa can be any naturally occurring amino acid
<220> FEATURE:
<221> NAME/KEY: SITE
<222> LOCATION: (232)..(232)
<223> OTHER INFORMATION: X or Xaa is * which is the result of early stop
      codon
<220> FEATURE:
<221> NAME/KEY: misc_feature
<222> LOCATION: (232)..(232)
<223> OTHER INFORMATION: Xaa can be any naturally occurring amino acid
<220> FEATURE:
<221> NAME/KEY: SITE
<222> LOCATION: (234)..(234)
<223> OTHER INFORMATION: X or Xaa is * which is the result of early stop
      codon
<220> FEATURE:
<221> NAME/KEY: misc_feature
<222> LOCATION: (234)..(234)
<223> OTHER INFORMATION: Xaa can be any naturally occurring amino acid
<220> FEATURE:
<221> NAME/KEY: SITE
<222> LOCATION: (246)..(246)
<223> OTHER INFORMATION: X or Xaa is * which is the result of early stop
      codon
<220> FEATURE:
<221> NAME/KEY: misc_feature
<222> LOCATION: (246)..(246)
<223> OTHER INFORMATION: Xaa can be any naturally occurring amino acid
<220> FEATURE:
```

```
<221> NAME/KEY: SITE
<222> LOCATION: (254)..(254)
<223> OTHER INFORMATION: X or Xaa is * which is the result of early stop
      codon
<220> FEATURE:
<221> NAME/KEY: misc_feature
<222> LOCATION: (254)..(254)
<223> OTHER INFORMATION: Xaa can be any naturally occurring amino acid
<220> FEATURE:
<221> NAME/KEY: SITE
<222> LOCATION: (276)..(276)
<223> OTHER INFORMATION: X or Xaa is * which is the result of early stop
      codon
<220> FEATURE:
<221> NAME/KEY: misc_feature
<222> LOCATION: (276)..(276)
<223> OTHER INFORMATION: Xaa can be any naturally occurring amino acid
<220> FEATURE:
<221> NAME/KEY: SITE
<222> LOCATION: (296)..(296)
<223> OTHER INFORMATION: X or Xaa is * which is the result of early stop
      codon
<220> FEATURE:
<221> NAME/KEY: misc_feature
<222> LOCATION: (296)..(296)
<223> OTHER INFORMATION: Xaa can be any naturally occurring amino acid
<220> FEATURE:
<221> NAME/KEY: SITE
<222> LOCATION: (319)..(319)
<223> OTHER INFORMATION: X or Xaa is * which is the result of early stop
      codon
<220> FEATURE:
<221> NAME/KEY: misc_feature
<222> LOCATION: (319)..(319)
<223> OTHER INFORMATION: Xaa can be any naturally occurring amino acid
<220> FEATURE:
<221> NAME/KEY: SITE
<222> LOCATION: (344)..(344)
<223> OTHER INFORMATION: X or Xaa is * which is the result of early stop
      codon
<220> FEATURE:
<221> NAME/KEY: misc_feature
<222> LOCATION: (344)..(344)
<223> OTHER INFORMATION: Xaa can be any naturally occurring amino acid
<220> FEATURE:
<221> NAME/KEY: SITE
<222> LOCATION: (366)..(366)
<223> OTHER INFORMATION: X or Xaa is * which is the result of early stop
      codon
<220> FEATURE:
<221> NAME/KEY: misc_feature
<222> LOCATION: (366)..(366)
<223> OTHER INFORMATION: Xaa can be any naturally occurring amino acid
<220> FEATURE:
<221> NAME/KEY: SITE
<222> LOCATION: (375)..(375)
<223> OTHER INFORMATION: X or Xaa is * which is the result of early stop
      codon
<220> FEATURE:
<221> NAME/KEY: misc_feature
<222> LOCATION: (375)..(375)
<223> OTHER INFORMATION: Xaa can be any naturally occurring amino acid
<220> FEATURE:
<221> NAME/KEY: SITE
<222> LOCATION: (402)..(402)
<223> OTHER INFORMATION: X or Xaa is * which is the result of early stop
      codon
<220> FEATURE:
<221> NAME/KEY: misc_feature
<222> LOCATION: (402)..(402)
<223> OTHER INFORMATION: Xaa can be any naturally occurring amino acid
<220> FEATURE:
<221> NAME/KEY: SITE
<222> LOCATION: (413)..(413)
<223> OTHER INFORMATION: X or Xaa is * which is the result of early stop
      codon
<220> FEATURE:
<221> NAME/KEY: misc_feature
<222> LOCATION: (413)..(413)
```

```
<223> OTHER INFORMATION: Xaa can be any naturally occurring amino acid
<220> FEATURE:
<221> NAME/KEY: SITE
<222> LOCATION: (430)..(430)
<223> OTHER INFORMATION: X or Xaa is * which is the result of early stop
      codon
<220> FEATURE:
<221> NAME/KEY: misc_feature
<222> LOCATION: (430)..(430)
<223> OTHER INFORMATION: Xaa can be any naturally occurring amino acid
<220> FEATURE:
<221> NAME/KEY: SITE
<222> LOCATION: (490)..(490)
<223> OTHER INFORMATION: X or Xaa is * which is the result of early stop
      codon
<220> FEATURE:
<221> NAME/KEY: misc_feature
<222> LOCATION: (490)..(490)
<223> OTHER INFORMATION: Xaa can be any naturally occurring amino acid

<400> SEQUENCE: 42

Met Ala Met Ala Gly Leu Tyr Arg Arg Val Leu Pro Ser Pro Pro Ala
1               5                   10                  15

Val Asp Phe Ala Ser Thr Glu Gly Lys Gln Leu Phe Leu Glu Ala Ile
            20                  25                  30

Gln Asn Gly Asn Asn Gly Arg Ile Phe Gln Val Asp Leu Leu Phe Ser
        35                  40                  45

Asp Thr Val Xaa Thr Gly Leu Leu Trp Phe Gly Xaa Pro Phe Tyr Gly
50                  55                  60

Leu Glu Cys Pro Cys Tyr Xaa Ser Arg Lys Lys Met Glu Arg Ala Leu
65                  70                  75                  80

Glu Met Val Xaa Xaa Ile Tyr Val Gly Leu Leu Xaa Ala Ser Gly Glu
                85                  90                  95

Gly Xaa Ser Xaa Arg Asp Leu Phe Trp Glu Ser Gly Met Phe Gly Ser
            100                 105                 110

Leu Cys Arg Ser Glu Gly Arg Ser Phe Ser Leu Xaa Ser Xaa Tyr Tyr
        115                 120                 125

Xaa Xaa Leu Pro Xaa Thr Ser His Gly Leu His Tyr Xaa Xaa Xaa Leu
130                 135                 140

Ser Ser Asp Leu Ile Ile Ser Xaa Arg Pro Phe Xaa Ala Asp Arg Phe
145                 150                 155                 160

Gly Pro Leu Phe Ala Tyr Trp Trp Leu Ser Arg Gly Lys Gly Tyr Gly
                165                 170                 175

Thr Asp Ser Arg Cys Cys Glu Val Xaa Ile Ser Ser Ser Leu Gly Ser
            180                 185                 190

Pro Pro Ser Pro Leu Gly Ser His Glu His Asn Xaa Xaa Ser Tyr Arg
        195                 200                 205

Ile Thr Xaa Gly Val Tyr Ala Asn Tyr Xaa Ala Ser Gln Ser Ser Cys
210                 215                 220

Thr Ala Ile Tyr Pro Glu Leu Xaa Thr Xaa Glu Leu Gly His Tyr Leu
225                 230                 235                 240

Lys Ala Phe Asp Gly Xaa Ser Ser Cys Pro Val Lys Phe Xaa Glu Cys
                245                 250                 255

Glu Gly His Lys Arg Cys Ser Leu Tyr Cys Ser Phe Lys Ser Thr Phe
            260                 265                 270

Lys Phe Cys Xaa Ile His Lys Val Asp Ser Gly Ser Ser Lys Ala Arg
        275                 280                 285

Gly Glu Trp Ser Lys Phe Glu Xaa Arg Gly Glu Arg Lys Ala Ser Tyr
290                 295                 300
```

Gln Gly Arg Gly Ile Glu Thr Ser Ala Gly His Ser Ser Leu Xaa Ala
305                 310                 315                 320

Cys His Lys His Phe Ile Phe Lys Lys Phe Tyr Leu Pro Val Lys Ser
            325                 330                 335

Ser Ile Arg Gln Gln Phe Gly Xaa Cys Cys Arg Lys His Leu Leu Pro
            340                 345                 350

Arg Ser Arg Ser Phe Cys Arg Lys Ile Trp Phe Ile Gly Xaa Val Leu
            355                 360                 365

Leu Ser Pro Asn Met Cys Xaa Met Leu Gln Ser Tyr Arg Gly Gln Phe
            370                 375                 380

Cys Tyr Ser Gly Val Trp Asp Ser Cys Lys Trp Glu Trp Gly Ala Gly
385                 390                 395                 400

Gly Xaa Cys Ser Gly Pro Tyr Ile Ser Ser Lys Asp Xaa Leu Leu Ser
            405                 410                 415

Leu Arg Ala Ser Trp Leu Leu Ala Asn Ala Pro Cys Lys Xaa Arg Cys
            420                 425                 430

Ala Asp Ser Thr Ile Ala Gly Ile Thr Ser Thr Tyr Met Val Ser Asn
            435                 440                 445

Lys Arg Tyr Glu Gly Leu Ala Gly Asn Arg Glu Pro Cys Leu Ser Arg
            450                 455                 460

Glu Pro Ala Ser Phe Ala Ala Arg Arg Asp Phe Ala Pro Ala Arg Thr
465                 470                 475                 480

Val Pro Pro Gln Glu Met Gln Gly Xaa Gln Gly Arg Arg Arg Phe
                    485                 490                 495

Ser Cys Thr Ser Leu Leu
            500

<210> SEQ ID NO 43
<211> LENGTH: 304
<212> TYPE: DNA
<213> ORGANISM: Artificial
<220> FEATURE:
<223> OTHER INFORMATION: P_U6 sequence

<400> SEQUENCE: 43
agaaatctca aaattccggc agaacaattt tgaatctcga tccgtagaaa cgagacggtc      60
attgttttag ttccaccacg attatatttg aaatttacgt gagtgtgagt gagacttgca     120
taagaaaata aaatctttag ttgggaaaaa attcaataat ataaatgggc ttgagaagga     180
agcgagggat aggccttttt ctaaatagg cccatttaag ctattaacaa tcttcaaaag      240
taccacagcg cttaggtaaa gaaagcagct gagtttatat atggttagag acgaagtagt     300
gatt                                                                  304

<210> SEQ ID NO 44
<211> LENGTH: 74
<212> TYPE: DNA
<213> ORGANISM: Artificial
<220> FEATURE:
<223> OTHER INFORMATION: NtHMAalpha_gDNA_ref

<400> SEQUENCE: 44
tctatctttt gtggatgtag ttaaagcatt gaatcaagca agattagaag caagcataag      60
agtgaaagga gaga                                                        74

<210> SEQ ID NO 45
<211> LENGTH: 54
<212> TYPE: DNA

```
<213> ORGANISM: Artificial
<220> FEATURE:
<223> OTHER INFORMATION: NtHMAalpha_CDS_ref

<400> SEQUENCE: 45
ttaaagcatt gaatcaagca agattagaag caagcataag agtgaaagga gaga          54

<210> SEQ ID NO 46
<211> LENGTH: 54
<212> TYPE: DNA
<213> ORGANISM: Artificial
<220> FEATURE:
<223> OTHER INFORMATION: NtHMAbeta_CDS_ref

<400> SEQUENCE: 46
ttaaagcatt gaatcaagca agattagaag caagtataag agtgaaagga gaga          54

<210> SEQ ID NO 47
<211> LENGTH: 74
<212> TYPE: DNA
<213> ORGANISM: Artificial
<220> FEATURE:
<223> OTHER INFORMATION: NtHMAalpha_gDNA_KF109

<400> SEQUENCE: 47
tctatctttt gtggatgtag ttaaagcatt gaatcaagca agattagaag caagcataag   60
agtgaaagga gaga                                                     74

<210> SEQ ID NO 48
<211> LENGTH: 23
<212> TYPE: DNA
<213> ORGANISM: Artificial
<220> FEATURE:
<223> OTHER INFORMATION: gRNA_A4_e2

<400> SEQUENCE: 48
gaagcaagca taagagtgaa agg                                           23

<210> SEQ ID NO 49
<211> LENGTH: 76
<212> TYPE: DNA
<213> ORGANISM: Artificial
<220> FEATURE:
<223> OTHER INFORMATION: NtHMAbeta_gDNA_ref

<400> SEQUENCE: 49
tctttctttt gtggatgtag ttaaagcatt gaatcaagca agattagaag caagtataag   60
agtgaaagga gagaaa                                                   76

<210> SEQ ID NO 50
<211> LENGTH: 56
<212> TYPE: DNA
<213> ORGANISM: Artificial
<220> FEATURE:
<223> OTHER INFORMATION: NtHMAalpha_CDS_ref

<400> SEQUENCE: 50
ttaaagcatt gaatcaagca agattagaag caagcataag agtgaaagga gagaaa       56

<210> SEQ ID NO 51
<211> LENGTH: 56
<212> TYPE: DNA
<213> ORGANISM: Artificial
<220> FEATURE:
<223> OTHER INFORMATION: NtHMAbeta_CDS_ref
```

```
<400> SEQUENCE: 51
ttaaagcatt gaatcaagca agattagaag caagtataag agtgaaagga gagaaa         56

<210> SEQ ID NO 52
<211> LENGTH: 76
<212> TYPE: DNA
<213> ORGANISM: Artificial
<220> FEATURE:
<223> OTHER INFORMATION: NtHMAbeta_gDNA_KF109

<400> SEQUENCE: 52
tctttctttt gtggatgtag ttaaagcatt gaatcaagca agattagaag caagtataag    60
agtgaaagga gagaaa                                                    76

<210> SEQ ID NO 53
<211> LENGTH: 36
<212> TYPE: DNA
<213> ORGANISM: Artificial
<220> FEATURE:
<223> OTHER INFORMATION: gRNA_B4_e2

<400> SEQUENCE: 53
agattagaag caagtataag agtgaaagga gagaaa                              36

<210> SEQ ID NO 54
<211> LENGTH: 31
<212> TYPE: DNA
<213> ORGANISM: Artificial
<220> FEATURE:
<223> OTHER INFORMATION: NtHMAbeta KB108 WT

<400> SEQUENCE: 54
aagcaagtat aagagtgaaa ggagagaaaa a                                   31

<210> SEQ ID NO 55
<211> LENGTH: 31
<212> TYPE: DNA
<213> ORGANISM: Artificial
<220> FEATURE:
<223> OTHER INFORMATION: NtHMAbeta KB108 variant

<400> SEQUENCE: 55
aagcaagtat aagagtagaa aggagagaaa a                                   31
```

TRANSGENIC PLANT WITH REDUCED HEAVY METALS AND METHODS FOR PREPARATION THEREOF

CROSS REFERENCE TO RELATED APPLICATIONS

This application is a National Stage of International Application No. PCT/KR2021/011059 filed Aug. 19, 2021, claiming priority based on Korean Patent Application No. 10-2020-0114891 filed Sep. 8, 2020.

INCORPORATION BY REFERENCE OF SEQUENCE LISTING

The content of the electronically submitted sequence listing, file name: Q273234_Substitute sequence listing second.txt; size: 52,147 bytes; and date of creation: Dec. 31, 2024, filed herewith, is incorporated herein by reference in its entirety.

TECHNICAL FIELD

The present disclosure relates to a transgenic plant with reduced heavy metals and a method for preparation thereof

BACKGROUND ART

Heavy metals such as lead, cadmium, mercury, etc. are pollutants derived from the environment, and exposed through foods, water, air, soil, etc. The general public mainly intakes heavy metals through foods, and trace amounts of heavy metals absorbed into the body accumulate in organs such as bones, kidneys, etc., and are known to adversely affect health. The Ministry of Food and Drug Safety (MFDS) tracked changes in the concentration of heavy metals in the bodies of Koreans from 2010 to 2015 and analyzed the relationship with food intake or lifestyle. As a result, it was confirmed that drinking, smoking, and eating habits are related to the concentration of heavy metals in the body. With regard to smoking, the absorption rate through inhalation is higher than the absorption rate through ingestion, and harmful substances such as heavy metals from cigarettes themselves enter the body and increase the concentration of heavy metals in the body. Therefore, it is required to develop tobacco plants in which the heavy metal content therein or the absorption rate of heavy metals from soil during cultivation may be reduced.

In addition, many heavy metals naturally exist in the soil and are absorbed by plants to different degrees. Some heavy metals, such as manganese or zinc, are essential for plants because they are cofactors required for enzymatic activity, whereas other heavy metals are not essential for plants, and thus it is beneficial to reduce the concentration of heavy metals. For example, cadmium (Cd) has been reported as a heavy metal having no beneficial effect on plant or human development, and is classified as a human carcinogen. When Cd excessively accumulates in plants, it has detrimental effects such as the reduction of leaf surface and the reduction of dry weight, water content, chlorophyll content, and carotenoid content.

In particular, tobacco is a plant species characterized by having an ability to accumulate four times higher levels of Cd in the shoot than in the root, and thus it is desirable to reduce the accumulation of Cd in plants such as tobacco. In this regard, there is known a method of preparing a plant variant having reduced expression or activity of an NtHMA gene as a tobacco plant with reduced cadmium accumulation (Korean Patent Publication No. 10-2018-0107123). However, the tobacco plant variant prepared by the method has a problem in that it cannot grow normally as compared with the wild-type tobacco plant.

In view of this background, the present inventors found that by inducing a mutation in a phytochelatin synthase (NtPCS) gene of tobacco plants, the content or the absorption of heavy metals is remarkably reduced as compared with wild-type tobacco plants, while maintaining excellent growth characteristics, thereby completing the present disclosure.

DESCRIPTION OF EMBODIMENTS

Technical Problem

An aspect provides a plant cell, in which expression or activity of a phytochelatin synthase (PCS) gene or a protein encoded by the PCS gene is reduced, as compared with a parent cell.

Another aspect provides a plant having reduced heavy metal absorption, the plant including a plant cell, in which expression or activity of a PCS gene or a protein encoded by the PCS gene is reduced, as compared with a parent cell.

Still another aspect provides a method of reducing heavy metals in a plant, the method including reducing expression or activity of a PCS gene or a protein encoded by the PCS gene, as compared with a parent cell.

Still another aspect provides a CRISPR-Cas9 recombinant vector including a single guide RNA targeting a PCS gene.

Still another aspect provides a method of preparing a plant having reduced heavy metal absorption, the method including transforming a plant cell with a CRISPR-Cas9 recombinant vector including a single guide RNA targeting a PCS gene.

Solution to Problem

An aspect provides a plant cell, in which expression or activity of a phytochelatin synthase (PCS) gene or a protein encoded by the PCS gene is reduced, as compared with a parent cell.

As used herein, the term "parent cell", which is a cell that has not been artificially manipulated to reduce expression or activity of the PCS gene or the protein encoded by the PCS gene, may refer to a cell freshly isolated from a plant or a cell cultured therefrom.

As used herein, the term "phytochelatin synthase (PCS)" is, also called glutathione gamma-glutamylcysteinyltransferase or gamma-glutamylcysteine dipeptidyl transpeptidase, an enzyme that produces two products of Gly and [Glu(-Cys)]n+1-Gly from two substrates of glutathione and [Glu(-Cys)]n-Gly. In tobacco plants, PCS is a protein involved in storage and transport of intracellular metal ions by binding thereto, and specifically, it is a protein expected to be involved in the intracellular long-distance transport of heavy metals including cadmium, zinc, etc.

The PCS gene may be a PCS gene (NtPCSs) derived from *Nicotiana sylvestris*, a PCS gene (NtPCSt) derived from *Nicotiana tomentosiformis*, or a combination thereof (NtPCSst).

The plant cell may be genetically engineered to reduce expression or activity of the PCS gene or the protein encoded by the PCS gene. As used herein, the term "genetic engineering" or "genetically engineered" may refer to manipulation to introduce one or more genetic modifications into a cell or a cell prepared thereby.

The genetic engineering may be induced by modification in a nucleotide sequence of the PCS gene by a physical method. The physical method may be, for example, X-ray irradiation, gamma-ray irradiation, etc.

The genetic engineering may be induced by a modification in the nucleotide sequence of the PCS gene or a change in the gene expression by a chemical method. The chemical method may be, for example, ethyl methanesulfonate treatment, dimethyl sulfate treatment, etc.

The genetic engineering may be induced by a modification in the nucleotide sequence of the PCS gene by a gene editing system. The gene editing system may be, for example, a meganuclease system, a zinc finger nuclease system, a transcription activator-like effector nuclease (TALEN) system, a CRISPR/Cas9 system, etc. For example, the genetic engineering may be induced by a change in the gene expression by binding to mRNA transcribed from the PCS gene by an RNA interference (RNAi) system.

In one specific embodiment, the plant cell may reduce the expression or activity of the PCS gene or the protein encoded by the PCS gene by the CRISPR/Cas9 system.

The term "genetically engineered plant cell", in which "the expression or activity of the PCS gene or the protein encoded by the PCS gene is reduced", the PCS gene is "inactivated", "the expression or activity" of the PCS protein is reduced, or the PCS gene is "inactivated", means that the expression or activity level of the PCS gene or the protein encoded by the PCS gene is lower than that of a PCS gene or a protein encoded by a PCS gene, which is measured in a comparable plant cell of the same species or a parent cell thereof, or the PCS gene or the protein encoded by the PCS gene exhibits no expression or activity. In other words, in the plant cell, the expression or activity of the PCS gene or the protein encoded by the PCS gene exhibits about 20% or more, about 30% or more, about 40% or more, about 50% or more, about 55% or more, about 60% or more, about 70% or more, about 75% or more, about 80% or more, about 85% or more, about 90% or more, about 95% or more, or about 100% reduction, as compared with that of the non-engineered original plant cell. The genetically engineered plant cell, in which the expression or activity of the PCS gene or the protein encoded by the PCS gene is reduced, may be identified by any known method in the art. The term "inactivation" may mean that a gene is not expressed at all or a protein having no activity is produced even though expressed. The term "reduction (depression)" may mean that the PCS gene is expressed at a low level, as compared with that of a non-engineered plant cell, or may mean that the activity of the protein encoded by the PCS gene is low even though expressed.

Another aspect relates to a plant having reduced heavy metal absorption, the plant including the plant cell. Detailed descriptions of the plant cell, etc. are as described above.

The plant may be *Nicotiana tabacum*, specifically, flue-cured-, Burley, old tobacco variety, black, or oriental variety, and more specifically, Burley or flue-cured variety.

In one specific embodiment, the plant may be a plant, in which the content or absorption of heavy metals is reduced in the same generation as well as in subsequent generations, by including the plant cell, in which the expression or activity of the PCS gene or the protein encoded by the PCS gene is reduced. Thus, it is possible to continuously obtain a plant with reduced heavy metals.

Still another aspect provides a method of reducing heavy metals in a plant, the method including reducing expression or activity of the PCS gene or the protein encoded by the PCS gene, as compared with a parent cell of the plant. Detailed descriptions of the parent cell, PCS, plant cell, reduction of the expression or activity, etc. are as described above.

Reducing of the expression or activity of the PCS gene or the PCS protein may be performed by variation, substitution, or deletion of a part or all of the gene encoding the PCS, or insertion of one or more bases in the gene, and may be performed via a PCS gene editing means.

In reducing the expression or activity of the PCS gene or the protein encoded by the PCS gene, at least one selected from the group consisting of an RNA interference (RNAi) system, a meganuclease system, a zinc finger nuclease system, a transcription activator-like effector nuclease (TALEN) system, a CRISPR/Cas9 system, X-ray irradiation, gamma-ray irradiation, ethyl methanesulfonate treatment, and dimethyl sulfate treatment may be performed.

Gene manipulation artificially performed to reduce the expression or activity of the PCS gene or the protein encoded by the PCS gene may be preventing the PCS gene from being expressed into a protein form having its intrinsic function. The gene manipulation may be induced by one or more of the following manipulations: 1) deletion of all or a part of the PCS gene, e.g., deletion of 1 bp or more nucleotides, e.g., 1 nucleotide to 30 nucleotides, 1 nucleotide to 27 nucleotides, 1 nucleotide to 25 nucleotides, 1 nucleotide to 23 nucleotides, 1 nucleotide to 20 nucleotides, 1 nucleotide to 15 nucleotides, 1 nucleotide to 10 nucleotides, 1 to 5 nucleotides, 1 nucleotide to 3 nucleotides, or 1 nucleotide of the PCS gene; 2) substitution of 1 bp or more nucleotides of the PCS gene, e.g., 1 nucleotide to 30 nucleotides, 1 nucleotide to 27 nucleotides, 1 nucleotide to 25 nucleotides, 1 nucleotide to 23 nucleotides, 1 nucleotide to 20 nucleotides, 1 nucleotide to 15 nucleotides, 1 nucleotide to 10 nucleotides, 1 to 5 nucleotides, 1 nucleotide to 3 nucleotides, or 1 nucleotide with different nucleotides from the original (wild-type); 3) insertion of one or more nucleotides, e.g., 1 nucleotide to 30 nucleotides, 1 nucleotide to 27 nucleotides, 1 nucleotide to 25 nucleotides, 1 nucleotide to 23 nucleotides, 1 nucleotide to 20 nucleotides, 1 nucleotide to 15 nucleotides, 1 nucleotide to 10 nucleotides, 1 to 5 nucleotides, 1 nucleotide to 3 nucleotides, or 1 nucleotide (each independently selected from A, T, C, and G) into any site of the target gene; and 4) a combination of two or more selected from 1) to 3).

A part modified in the PCS gene ('target site') may be a consecutive nucleotide sequence of 1 bp or more, 3 bp or more, 5 bp or more, 7 bp or more, 10 bp or more, 12 bp or more, 15 bp or more, 17 bp or more, 20 bp or more, e.g., 1 bp to 30 bp, 3 bp to 30 bp, 5 bp to 30 bp, 7 bp to 30 bp, 10 bp to 30 bp, 12 bp to 30 bp, 15 bp to 30 bp, 17 bp to 30 bp, 20 bp to 30 bp, 1 bp to 27 bp, 3 bp to 27 bp, 5 bp to 27 bp, 7 bp to 27 bp, 10 bp to 27 bp, 12 bp to 27 bp, 15 bp to 27 bp, 17 bp to 27 bp, 20 bp to 27 bp, 1 bp to 25 bp, 3 bp to 25 bp, 5 bp to 25 bp, 7 bp to 25 bp, 10 bp to 25 bp, 12 bp to 25 bp, 15 bp to 25 bp, 17 bp to 25 bp, 20 bp to 25 bp, 1 bp to 23 bp, 3 bp to 23 bp, 5 bp to 23 bp, 7 bp to 23 bp, 10 bp to 23 bp, 12 bp to 23 bp, 15 bp to 23 bp, 17 bp to 23 bp, 20 bp to 23 bp, 1 bp to 20 bp, 3 bp to 20 bp, 5 bp to 20 bp, 7 bp to 20 bp, 10 bp to 20 bp, 12 bp to 20 bp, 15 bp to 20 bp, 17 bp to 20 bp, 21 bp to 25 bp, 18 bp to 22 bp, or 21 bp to 23 bp in the gene.

For example, to prepare a PCS-knockout plant cell, single-stranded or double-stranded cleavage of a specific site within a target gene is catalyzed by a genome editing system including a rare-cutting endonuclease that cuts a rare gene sequence with a very low abundance in the genome to reduce expression of the PCS gene which is the target gene. Nucleic acid strand breaks catalyzed by the rare-cutting endonuclease may be repaired through mechanisms such as homologous recombination, non-homologous end joining (NHEJ), etc. The rare-cutting endonuclease may be one or more selected from the group consisting of meganuclease, zinc finger nuclease, CRISPR/Cas9 (Cas9 protein), CRISPR-Cpf1 (Cpf1 protein), and TALE-nuclease.

The heavy metal may be one or more selected from the group consisting of cadmium, arsenic, antimony, lead, mercury, chromium, tin, zinc, barium, bismuth, nickel, cobalt, manganese, iron, copper, and vanadium. In one specific embodiment, the content or absorption of cadmium in the plant may be reduced by reducing the expression or activity of the PCS gene or the protein encoded by the PCS gene.

Still another aspect provides a CRISPR-Cas9 recombinant vector including a single guide RNA targeting the PCS gene. Detailed descriptions of the PCS gene, plant cell, etc. are as described above.

As used herein, the terms "single guide RNA (sgRNA)" may be used interchangeably with "chimeric RNA", "chimeric guide RNA", "guide RNA", "single guide RNA (sgRNA)", and "synthetic guide RNA". It refers to a polynucleotide sequence including a guide sequence, a tracr sequence, and/or a tracr mate sequence. The term "guide sequence" refers to an about 20 bp-sequence in a guide RNA that designates a target site, and may be used interchangeably with the term "guide" or "spacer". Further, the term "tracr mate sequence" may be used interchangeably with the term "direct repeat(s)". The guide RNA may consist of two RNAs, i.e., CRISPR RNA (crRNA) and transactivating crRNA (tracrRNA), or may be a single-stranded RNA (sgRNA) including a portion of crRNA and tracrRNA and hybridizing with the target DNA.

The PSC gene targeted by the sgRNA may be a PCS gene (NtPCSs) derived from *Nicotiana sylvestris*, or a PCS gene (NtPCSt) derived from *Nicotiana tomentosiformis*.

The sgRNA targeting the NtPCSt gene may consist of a nucleotide sequence of SEQ ID NO: 1 or SEQ ID NO: 2, the sgRNA targeting the NtPCSt gene may consist of a nucleotide sequence of SEQ ID NO: 3 or SEQ ID NO: 4, and the sgRNA targeting both the NtPCSs gene and the NtPCSt gene may consist of a nucleotide sequence of SEQ ID NO: 5 or SEQ ID NO: 6.

In general, the guide sequence is any polynucleotide sequence having complementarity with a target polynucleotide sequence, which is sufficient to hybridize with the target sequence and to induce sequence-specific binding of a CRISPR complex to the target sequence. In addition, any nucleotide sequence that may be used for gene manipulation to reduce the expression or activity of the PCS gene or the protein expressed by the PCS gene may be used as the guide RNA without limitation. For example, the nucleotide sequence is a sequence capable of hybridizing with the PCS gene. In addition, a portion of the guide RNA nucleotide sequence may be modified to modify/enhance the function of the guide RNA. Further, in an embodiment, the degree of complementarity between a guide sequence and its corresponding target sequence, when optimally aligned using an appropriate alignment algorithm, is about 50%, about 60%, about 75%, about 80%, about 85%, about 90%, about 95%, about 97.5%, about 99% or more. Optimal alignment may be determined by using any suitable algorithm for aligning the sequences, and non-limiting examples thereof include a Smith-Waterman algorithm, a Needleman-Wunsch algorithm, a Burrows-Wheeler Transform-based algorithm (e.g., Burrows Wheeler Aligner), ClustalW, Clustal X, BLAT, Novoalign (Novocraft Technologies), ELAND (Illumina, San Diego, CA, USA), SOAP (available at soap.genomics.org.cn) and Ma(available at maq.sourceforge.net).

In an embodiment, the guide sequence is, for example, about 5 nucleotides, about 10 nucleotides, about 11 nucleotides, about 12 nucleotides, about 13 nucleotides, about 14 nucleotides, about 15 nucleotides, about 16 nucleotides, about 17 nucleotides, about 18 nucleotides, about 19 nucleotides, about 20 nucleotides, about 21 nucleotides, about 22 nucleotides, about 23 nucleotides, about 24 nucleotides, about 25 nucleotides, about 26 nucleotides, about 27 nucleotides, about 28 nucleotides, about 29 nucleotides, about 30 nucleotides, about 35 nucleotides, about 40 nucleotides, about 45 nucleotides, about 50 nucleotides, about 75 or more nucleotides in length. In an embodiment, the guide sequence may be about 75 nucleotides, about 50 nucleotides, about 45 nucleotides, about 40 nucleotides, about 35 nucleotides, about 30 nucleotides, about 25 nucleotides, about 20 nucleotides, about 15 nucleotides, or about 12 nucleotides or less in length. The ability of the guide sequence to direct sequence-specific binding of the CRISPR complex to the target sequence may be assessed by any suitable assay. For example, components of the CRISPR system sufficient to form the CRISPR complex, including the guide sequence to be tested, may be provided to a host cell having the corresponding target sequence, such as by transfection with vectors encoding the components of the CRISPR sequence, for example, followed by an assessment of preferential cleavage within the target sequence, such as by Surveyor assay as described herein. Similarly, cleavage of a target polynucleotide sequence may be evaluated in a test tube by providing the target sequence, components of a CRISPR complex, including the guide sequence to be tested and a control guide sequence different from the test guide sequence, and comparing binding or rate of cleavage at the target sequence between the test and control guide sequence reactions. Other assays are possible, and may be easily used by those skilled in the art.

In one specific embodiment, the sgRNA may bind to the PCS gene of at least one allele in the plant cell, and specifically, may bind to the PCS gene of all alleles. When the guide RNA binds to the PCS gene of all alleles to knock out the PCS gene, heavy metal absorption and transport may be inhibited not only in plant cells of the same generation but also in plant cells of subsequent generations.

In one specific embodiment, the target sequence used to knock out the PCS gene in the plant cell may be, for example, at least one site of Exon 1 and Exon 2 of the PCS gene. In addition, in one specific embodiment, it was confirmed that sgRNA produced to target Exon 2 of the PCS gene in the plant cell may induce the most frequent mutations.

In one specific embodiment, the plant cell is a plant cell in which a specific target site of the PCS gene is cleaved by sgRNA and the gene is knocked out. By the knockout, heavy metal absorption and transport of the plant cell may be suppressed.

The gene knockout may refer to regulation of gene activity, for example, inactivation by deletion, substitution of all or part of the gene (e.g., one or more nucleotides), and/or insertion of one or more nucleotides. The gene inactivation refers to a modification whereby gene expression is suppressed or gene expression is reduced (downregulation), or a protein with loss of its original function is encoded. In addition, gene regulation refers to a functional change in the gene, resulting from a structural modification of a protein, obtained by deletion of exon sites due to simultaneous targeting of both intron sites surrounding one or more exons of the target gene, expression of a dominant negative protein, and expression of a competitive inhibitor secreted in a soluble form, etc.

As used herein, the term "vector" refers to a means for expressing a target gene in a host cell. The vector includes, for example, viral vectors such as plasmid vectors, cosmid vectors, bacteriophage vectors, adenovirus vectors, retrovirus vectors, and adeno-associated virus vectors. The vector that may be used as the recombinant vector may be prepared by manipulating a plasmid often used in the art (e.g., V1k_GE, pSC101, pGV1106, pACYC177, CoIE1, pKT230, pME290, pBR322, pUC8/9, pUC6, pBD9, pHC79, pIJ61, pLAFR1, pHV14, pGEX series, pET series, pUC19, etc.), phage or virus (e.g., SV40, etc.).

In the vector, a gene encoding a guide RNA binding to the PCS gene, a gene encoding the Cas9 protein, and a gene encoding the NLS may be operably linked to a promoter. The term "operably linked" refers to a functional linkage between a nucleotide expression control sequence (e.g., a promoter sequence) and another nucleotide sequence. The control sequence may be "operably linked" to regulate the transcription and/or translation of another nucleotide sequences.

In one specific embodiment, when the vector has a polynucleotide (P_U6) consisting of a nucleotide sequence of SEQ ID NO: 43 bound to the 5-end of the gene encoding the guide RNA binding to the PCS gene, and five consecutive thymines at the 3'-end thereof, unstable guide RNA may be stabilized.

The vector, typically, may be constructed as a vector for cloning or a vector for expression. The vector for expression may be a vector commonly used to express foreign proteins in plants, animals or microorganisms in the art. The vector may be constructed through various methods known in the art.

The vector may be constructed using a prokaryotic cell or a eukaryotic cell as a host. For example, when the vector to be used is an expression vector and a prokaryotic cell is used as a host, the vector may generally include a strong promoter capable of driving transcription (e.g., CMV promoter, trp promoter, lac promoter, tac promoter, T7 promoter, etc.), a ribosome binding site for initiation of translation, and a transcription/translation termination sequence. When a eukaryotic cell is used as a host, an origin of replication operating in the eukaryotic cell, which is included in the vector, includes f1 origin of replication, SV40 origin of replication, pMB1 origin of replication, adeno origin of replication, AAV origin of replication, BBV origin of replication, etc., but is not limited thereto. In addition, a promoter derived from the genome of a mammalian cell (e.g., metallothionein promoter) or a promoter derived from a mammalian virus (e.g., an adenovirus late promoter, a vaccinia virus 7.5K promoter, an SV40 promoter, a cytomegalovirus promoter and a tk promoter of HSV) may be used, and it generally has a polyadenylation sequence as a transcription termination sequence.

As used herein, the term "CRISPR/Cas9 system" may include single guide RNA (sgRNA) including CRISPR RNA (crRNA) and transactivating crRNA (tracrRNA). Further, the CRISPR/Cas9 system may include a CRISPR associated protein 9 (Cas9) protein or a gene encoding the Cas9 protein and a nuclear localization signal (NLS) protein or a gene encoding the NLS protein.

In general, a widely known gene editing means, "Clustered Regularly Interspaced Short Palindromic Repeats (CRISPR) system", collectively refers to transcripts and other elements involved in the expression of or directing the activity of CRISPR-associated (Cas) genes, including a Cas gene-encoding sequence, a trans-activating CRISPR (tracr) sequence (e.g., tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), or other sequences and transcripts from a guide RNA or a CRISPR locus. In some embodiments, one or more elements of the CRISPR system are derived from a type I, type II, or type III CRISPR system. In some embodiments, one or more elements of the CRISPR system are derived from a particular organism including the endogenous CRISPR system, e.g., *Streptococcus pyogenes*. In general, the CRISPR system is characterized by elements that promote the formation of the CRISPR complex at the site of a target sequence (also referred to as a protospacer in the context of an endogenous CRISPR system). In the context of formation of the CRISPR complex, "target sequence" or "target gene" refers to a sequence to which a guide sequence is designed to have complementarity, where hybridization between a target sequence and a guide sequence promotes formation of the CRISPR complex. Full complementarity is not necessarily required, provided there is sufficient complementarity to cause hybridization and to promote formation of the CRISPR complex. The target sequence may include any polynucleotide, for example, DNA or RNA polynucleotides. In some embodiments, the target sequence is located in the nucleus or cytoplasm of a cell. In some embodiments, the target sequence may exist within an organelle of a eukaryotic cell, for example, mitochondrion or chloroplast.

When the Cas protein forms a complex with two RNAs called CRISPR RNA (crRNA) and trans-activating crRNA (tracrRNA), an active endonuclease or nickase is formed. Non-limiting examples of the Cas proteins include Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, homologs thereof, or modified versions thereof. These enzymes are known; for example, an amino acid sequence of *Streptococcus pyogenes* Cas9 protein may be found in the SwissProt database under accession number of Q99ZW2. In some embodiments, the unmodified CRISPR enzyme, for example, Cas9 has DNA cleavage activity.

In some embodiments, the CRISPR enzyme is a Cas9 protein, and the Cas9 protein may be at least one Cas9 protein selected from the group consisting of a Cas9 protein derived from *Streptococcus pyogenes*, a Cas9 protein derived from *Campylobacter jejuni*, a Cas9 protein derived from *Streptococcus* thermophiles, a Cas9 protein derived from *Streptococcus aureus*, and a Cas9 protein derived from *Neisseria meningitidis*, and specifically, a Cas9 protein derived from *Streptococcus pyogenes*. In some embodiments, the Cas9 protein is codon-optimized for expression in eukaryotic cells, and when the Cas9 protein derived from *Streptococcus pyogenes* is used, the expression or activity of the PCS gene or the protein expressed by the PCS gene may be reduced to the maximum.

In some embodiments, the Cas9 protein may include a nuclear localization sequence or signal (NLS) at the 5'- or 3'-end, or both ends of the Cas9 protein to be located in the nucleus of a eukaryotic cell, wherein the NLS may be one or more.

As used herein, the term "NLS" refers to an amino acid sequence that serves to transport a specific substance (e.g., protein) into the nucleus of a cell, and generally acts to transport the substance into the nucleus of the cell via nuclear pores. The NLS is not required for the activity of CRISPR complex in eukaryotes, but it is believed that this sequence is included to enhance the activity of the system, particularly, to target a nucleic acid molecule in the nucleus.

In addition, RNA genetic scissors (RNA-guided clustered regularly interspaced short palindrome repeats (CRISPR)-associated nuclease Cas9) provides a breakthrough technology for target gene knockout, transcription activation, and inhibition using single guide RNA (sgRNA) (i.e., crRNA-tracrRNA fusion transcript), and this technology is known to target numerous gene loci.

Cas9 (or Cpf1) protein refers to an essential protein element in the CRISPR/Cas9 system, and information on the Cas9 (or Cpf1) gene and protein may be obtained from GenBank of the National Center for Biotechnology Information (NCBI), but is not limited thereto. With regard to the CRISPR-associated gene encoding Cas (or Cpf1) protein, about 40 or more different Cas (or Cpf1) protein families are known to exist. 8 CRISPR subtypes (Ecoli, Ypest, Nmeni, Dvulg, Tneap, Hmari, Apern, and Mtube) may be defined according to a specific combination of the cas gene and repeat structure. Therefore, each of the CRISPR subtypes may form a repeating unit to form a polyribonucleotide-protein complex.

When DNA encoding the Cas9 is delivered to an individual or cell, the DNA may generally (but not necessarily) include a regulatory element (e.g., a promoter) operable in a target cell. The promoter for Cas9 expression may be, for example, a CMV, EF-I a, EFS, MSCV, PGK, or CAG promoter. A promoter for gRNA expression may be, for example, a HI, EF-Ia, tRNA or U6 promoter. The promoter may be tissue-specific or cell-specific.

Still another aspect provides a method of preparing a plant having reduced heavy metal absorption, the method including transforming a plant cell with a CRISPR-Cas9 recombinant vector including a single guide RNA targeting the PCS gene. Detailed descriptions of the PCS gene, single guide RNA, CRISPR-Cas9 system, vector, plant cell, etc. are as described above.

In the transforming, the method is not particularly limited, as long as it is a transformation method well-known in the art and capable of transforming a tobacco gene. For example, the transforming may be performed by one method selected from the group consisting of an *Agrobacterium*-mediated transformation method, a polyethylene glycol (PEG)-mediated protoplast transformation method, a gene gun method, an electrode transformation method, a vacuum infiltration transformation method, and a silicon carbide fiber-mediated transformation method.

In one specific embodiment, considering characteristics and a transformation rate of tobacco, the recombinant vector including the single guide RNA targeting the PCS gene may be transformed into a plant cell by the *Agrobacterium*-mediated transformation method.

ADVANTAGEOUS EFFECTS OF DISCLOSURE

In a plant cell according to an aspect, in which expression or activity of a phytochelatin synthase (PCS) gene or a protein encoded by the PCS gene is reduced, pathways involved in absorption, storage, or transport of heavy metals by binding to heavy metal ions in the plant cells are inhibited, and thus there is an effect of reducing the content or absorption of heavy metals in the plant cell or a plant including the plant cell.

A plant cell according to another aspect, in which expression or activity of a PCS gene or a protein encoded by the PCS gene is reduced, may overcome a growth inhibition phenomenon, which is the limit of existing plants with reduced heavy metals.

BRIEF DESCRIPTION OF DRAWINGS

FIG. 1A shows a result of comparing exon 2 sites in NtHMAα genes (gRNA_A4_e2: a site specific to the NtHMAα gene, designed to bind with sgRNA; NtHMAα_gDNA_ref is SEQ ID NO: 44; NtHMAα_CDS_ref is SEQ ID NO: 45; NtHMAβ_CDS_ref is SEQ ID NO: 46; NtHMAα_gDNA_KF109 is SEQ ID NO: 47; gRNA_A4_e2 is SEQ ID NO: 48) and FIG. 1B shows a result of comparing exon 2 sites in the NtHMAβ genes (gRNA_B4_e2: a site specific to the NtHMAβ gene, designed to bind with sgRNA; NtHMAβ_gDNA_ref is SEQ ID NO: 49; NtHMAα_CDS_ref is SEQ ID NO: 50; NtHMAβ_CDS_ref is SEQ ID NO: 51; tHMAβ_gDNA_KF109 is SEQ ID NO: 52; gRNA_B4_e2 is SEQ ID NO: 53);

FIG. 3A shows a stage of cutting leaf tissues and transforming them by culturing with *Agrobacterium*, FIG. 3B shows a stage of inducing callus differentiation and shoot differentiation, FIG. 3C shows a stage of inducing root differentiation, and FIG. 3D shows a state of a plantlet in which differentiation is completed;

FIG. 5A shows a result of sequencing analysis of the KB108 (SEQ ID NO: 54) and FIG. 5B shows a result of sequencing analysis of the variant, in which a site into which an adenine base is inserted, compared to the nucleotide sequence of the wild-type, is indicated by a red arrow (SEQ ID NO: 55);

MODE OF DISCLOSURE

Hereinafter, the present disclosure will be described in more detail with reference to exemplary embodiments. However, these exemplary embodiments are only for illustrating, and the scope of the present disclosure is not limited to these exemplary embodiments.

Example 1. Production of Tobacco with Reduced Cadmium Using NtPCS Gene-Targeting CRISPR/Cas9 System (1) Construction of Gene Vehicle
(1.1) Examination of Nucleotide Sequences of Heavy Metal-Related Genes (NtHMA and NtPCS)

Two types of genes related to cadmium absorption and transport in tobacco were selected; NtHMAα and NtHMAβ, which are genes encoding proteins acting as gates that open and close when transporting divalent metal ions absorbed into roots to other tissues; and NtPCS, which is a gene encoding a protein involved in the storage and transport of metal ions by binding to metal ions in cells.

To examine nucleotide sequences of the NtHMA and NtPCS genes in a burley tobacco variety (KB108) which is a research target plant, primers specific to each gene were prepared, based on the nucleotide sequence information published in the National Center for Biotechnology Information (NCBI) database, and a gene amplification reaction (PCR: Polymerase Chain Reaction) was performed. The sequences of the primers specific to each gene and PCR conditions are shown in Table 1 below.

TABLE 1

| Primer name | Nucleotide sequence (5'→3') | Amplification size (bp) | PCR conditions | | | SEQ ID NO: |
|---|---|---|---|---|---|---|
| | | | Annealing Tmp | Extension time | Cycles | |
| F_HMAα | GAAACAAAGAAGTTGAGCAAGAGCTATT | 2937 | 62° C. | 90 sec | 35 | 7 |
| R_HMAα | AGCCTTAGTGAGATGATTTATAACACAA | | | | | 8 |
| F_HMAβ | GACACAAAGAATCTGAGCAAGAGCTATT | 2374 | 62° C. | 90 sec | 35 | 9 |
| R_HMAβ | AGCTAGAGTAGGACCACACATTAATTCT | | | | | 10 |
| F_PCSs | AAATGGCGATGGCGGGTTTGTAT | 927 | 68° C. | 90 sec | 35 | 11 |
| R_PCSs | GTCGGGAAGGATTAGAACACAAATTCAC | | | | | 12 |
| F_PCSt | AATGGCGATGGCGGGTTTATATC | 2731 | 68° C. | 90 sec | 35 | 13 |
| R_PCSt | AGTCCGGAAGGATAGGAACACAGATT | | | | | 14 |

Figure 1:
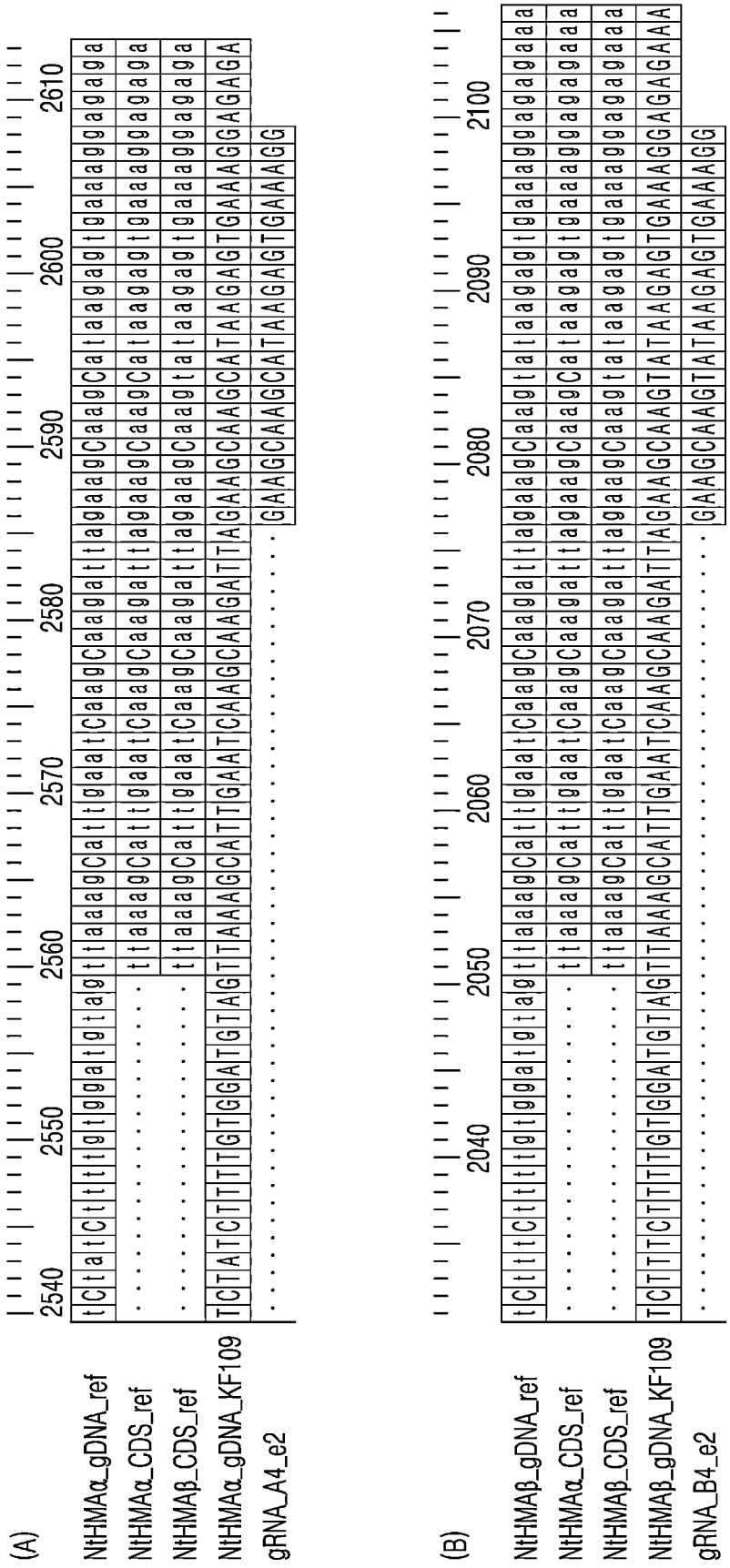
FIGS. 1A and 1B show alignment of a part of known reference nucleotide sequences and part of a nucleotide sequence of an NtHMA gene of KB108, specifically.

As shown in FIG. 1, as a result of analyzing the nucleotide sequence by amplifying the gDNA region of the KB108 variety, the nucleotide sequence was found to mostly correspond to the published nucleotide sequence. Specifically, as a result of aligning and comparing a part of the published reference nucleotide sequences (Database accession Nos. HF675180.1 and HF937054.1) with the nucleotide sequences of NtHMA genes of KB108, when comparing each exon 2 site in the NtHMAα gene (A) and NtHMAβ gene (B), most of them was confirmed to correspond to each other, and the site was designed such that sgRNA specifically bind to each gene.

The results of examining homology between the NtPCSs gene (only some sequences) of the KB108 variety, a reference genome nucleotide sequence of *N. tabacum* (TN90), and a reference genome nucleotide sequence of *N. sylvestris* are shown in Table 2 below, and the results of examining homology between the NtPCSt gene of the KB108 variety, a reference genome nucleotide sequence of *N. tabacum* (TN90), and a reference genome nucleotide sequence of *N. tometosiformis* are shown in Table 3 below.

TABLE 2

| Homology comparison of PCSs gene | PCSs_KB108 (KT&G) | PCSs_TN90 (NW_015845165.1) | PCSs_Nsyl (NW_009518934.1) |
| --- | --- | --- | --- |
| PCSs_KB108(KT&G) | ID | 1.000 | 1.000 |
| PCSs_TN90(NW_015845165.1) | 1.000 | ID | 1.000 |
| PCSs_Nsyl(NW_009518934.1) | 1.000 | 1.000 | ID |

TABLE 3

| Homology comparison of PCSt gene | PCSt_KB108 (KT&G) | PCSt_TN90 (NW_015825368.1) | PCSt_Ntom (NW_008939610.1) |
| --- | --- | --- | --- |
| PCSt_KB108(KT&G) | ID | 1.000 | 0.986 |
| PCSt_TN90(NW_015825368.1) | 1.000 | ID | 0.986 |
| PCSt_Ntom(NW_008939610.1) | 0.986 | 0.986 | ID |

The results of comparing nucleotide sequences of the NtPCSs gene derived from *Nicotiana sylvestris* and the NtPCSt gene derived from *Nicotiana tomentosiformis* with the reference genome nucleotide sequence of *N. tabacum* (TN90) showed 100% homology, as confirmed in Tables 2 and 3. Further, the NtPSs gene (only some sequences) showed 100% homology to the reference genome data of *N. sylvestris*, and the NtPCSt gene showed about 98.6% homology to the reference genome data of *N. tometosiformis*.

(1.2) Design of Genetic Scissors Block and Recombination of Vehicle

The nucleotide sequences of the NtHMAα, NtHMAβ, NtPCSs and NtPCSt genes obtained in Example 1-(1) were compared, and a part specific to each gene was selected as a genetic scissors guide (sgRNA). A total of 5 types of recombinant vehicles were completed by cloning gene scissors expression blocks selected as gene vehicles expressed in plants.

Information about the gene vehicles including each of six sgRNAs capable of specifically binding to the NtHMAα and NtHMAβ3 genes is shown in Table 4 below.

TABLE 4

| Vector | sgRNA | Target | Site | Sequence | SEQ ID NO: |
| --- | --- | --- | --- | --- | --- |
| V1k_HMAA6 | gRNA_A1 | HMAα | Exon 1 | TCTTTCTTACCAATTTGTTG | 15 |
| | gRNA_A2 | | Intron 1 | TGTTTGTACAAGCTTTTAGA | 16 |
| | gRNA_A3 | | Intron 1 | ATGGTAACTTCAATAATTATA | 17 |
| | gRNA_A4 | | Exon 2 | AAGCAAGCATAAGAGTGAA | 18 |
| | gRNA_A5 | | Exon 2 | CCACACCTCTAAAAATAAT | 19 |
| | gRNA_A6 | | Intron 2 | TCATATAAATTGGGACAAA | 20 |

TABLE 4-continued

| Vector | sgRNA | Target | Site | Sequence | SEQ ID NO: |
|---|---|---|---|---|---|
| V1k_HMAB6 | gRNA_B1 | HMAβ | Exon 1 | CAATTTGTTGCTGAG AAATG | 21 |
| | gRNA_B2 | | Intron 1 | AGTGGAGAAAAGAT GAAGAA | 22 |
| | gRNA_B3 | | Intron 1 | ATGGTAACTACAATA ATTATA | 23 |
| | gRNA_B4 | | Exon 2 | AAGCAAGTATAAGA GTGAA | 24 |
| | gRNA_B5 | | Exon 2 | GATTCCTCCAATTAT TTTT | 25 |
| | gRNA_B6 | | Exon 2 | CCACACCCCTAAAAA TAAT | 26 |

Information about the gene vehicles including each of two sgRNAs capable of specifically binding to the NtPCSs and NtPCSt genes is shown in Table 5 below.

TABLE 5

| Vector | sgRNA | Target | Site | Sequence | SEQ ID NO: |
|---|---|---|---|---|---|
| V1k_PCS_S | gRNA_S1 | PCSs | Exon 1 | AAGCGAAATCAACA GCCGGAG | 1 |
| | gRNA_S2 | | Exon 2 | GGCATTCAAGACCA TGGAA | 2 |
| V1k_PCS_T | gRNA_T1 | PCSt | Exon 1 | CGAGTTCTTCCGTC GCCTC | 3 |
| | gRNA_T2 | | Exon 2 | GGCATTCAAGACCA TAGAA | 4 |
| V1k_PCS_ST | gRNA_ST1 | PCSs PCSt | Exon 1 | TAGAAGCGAAATCA ACAGC | 5 |
| | gRNA_ST2 | | Exon 2 | GCCATCCAGAATGG AACAA | 6 |

In detail, pBI121, which is a binary vector replicable in *E. coli* and *agrobacterium* and is a vector widely used for plant transformation, was digested with HindII and EcoRI and prepared to clone a GE_block which is needed for the CRISPR/Cas9 system. The GE_block consists of, in this order, a CaMV 35S promoter with dual enhancer (P_35Sd), a multi cloning site (MCS) for cloning Cas9 block, a CaMV 35S terminator (T_35S), a linker sequence, and a multi cloning site (MCS) for cloning sgRNA block. HindIII and EcoRI recognition nucleotide sequences were added at both ends thereof. Each block of the GE_block was prepared by DNA synthesis, and sequentially cloned to complete the GE_block. A recombinant vehicle (V1k_GE) was prepared by ligation of pBI121 and GE_block, each digested with HindIII and EcoRI. CRISPR/Cas9_block consists of a block (Cas9_block) consisting of a Cas9 coding sequence (CDS) and a C-terminus nuclear localization sequence (NLS), and BamHI and Sac recognition nucleotide sequences at both ends thereof; and a block capable of expressing sgRNA (sgRNA_PMT) consisting of a U6 promoter (P_U6, SEQ ID NO: 43), sgRNA, and poly T. Two types of sgRNA blocks capable of specifically bind to NtPCS genes (NtPCSs and/or NtPCSt gene) were linked into one contiguous DNA through an overlap extension PCR technique to complete sgRNA_PMT. SalI and SpeI recognition nucleotide sequences exist at both ends of sgRNA_PMT.

Figure 2:
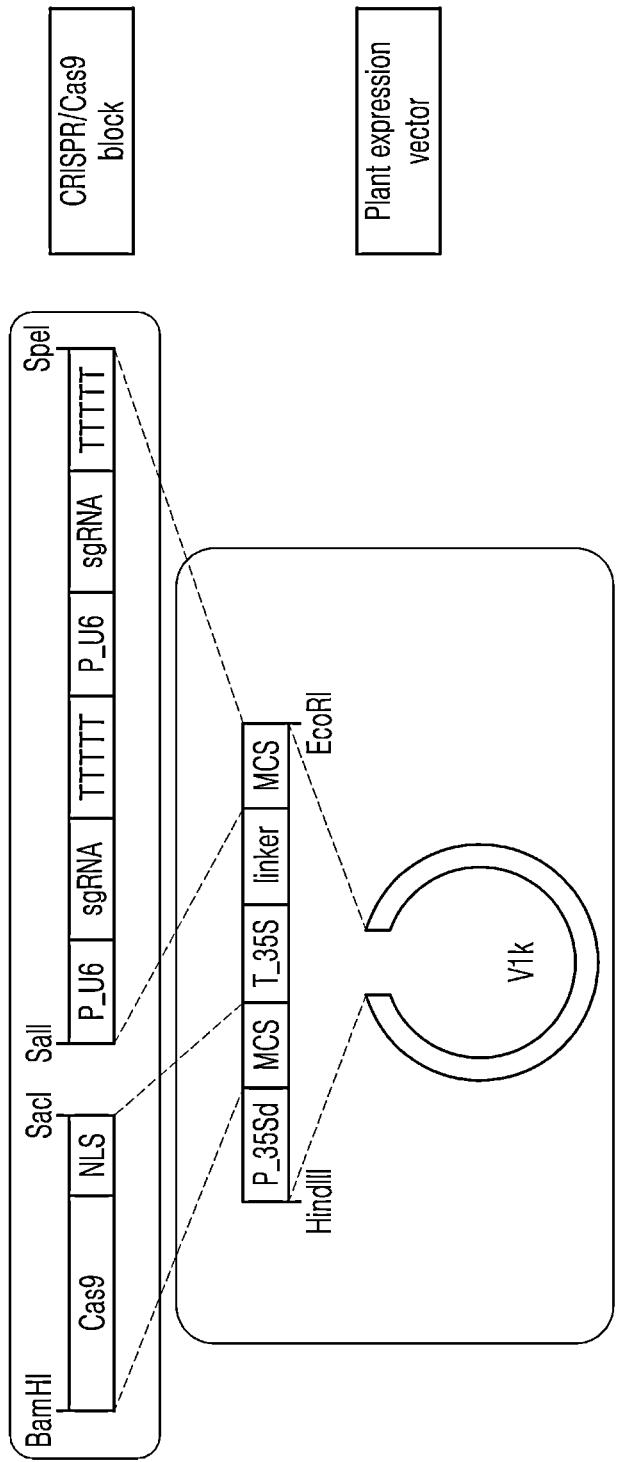
FIG. 2 shows a structure of a genetic scissors expression vector including two sgRNAs.

As shown in FIG. 2, V1k_GE and CRISPR/Cas9_block, each digested with BamHI and SacI, were ligated together through a ligation reaction, and then digested with SalI and SpeI, and sgRNA_PMT was inserted to construct a gene vehicle.

(2) Introduction of Recombinant Vehicle into Gene Transfer Microorganism (*Agrobacterium*)

A plant vehicle was transformed into *Agrobacterium* LBA4404 strain by a freeze-thaw method.

In detail, the *Agrobacterium* strain was inoculated in a YEP liquid medium (10 g of yeast extract, 10 g of Bacto™ peptone, 5 g of NaCl), and then incubated with shaking under conditions of 28° C. and 250 rpm for 16 hours. Cells were separated by centrifuging the culture medium under conditions of a speed of 3,000 g and 4° C. for 20 minutes, and suspended in 20 mM $CaCl_2$) to prepare competent cells. 5 μL of plasmid DNA (vehicle for plants) was added to 100 μL of competent cells, and incubated in liquid nitrogen for 5 minutes and at 37° C. for 5 minutes. 1 mL of YEP liquid medium was added and incubated with shaking under conditions of 28° C. and 250 rpm for 2 hours. 100 μL of the culture medium was spread on a YEP solid medium containing 100 mg/L of kanamycin, and then incubated at 28° C. for 3 days. Respective single colonies were sub-cultured, and whether the plasmid DNA was transformed was confirmed by PCR.

(3) Plant Tissue Culture (3.1) Plant Transformation

The *Agrobacterium* strain, in which transformation of the gene vehicle was confirmed in Example 1-(2) above, was cultured in a YEP liquid medium (including 70 mg/L kanamycin and 70 mg/L streptomycin) under conditions of 28° C. for 24 hours. In addition, the leaves of the plant at 1 month after germination were sterilized with 70% ethanol and Clorox, and cut into 3 mm×3 mm slices, which were placed in a Petri dish containing 5 ml of MS liquid medium, and then 1 mL of the culture solution of *Agrobacterium* strain was evenly sprayed to prepare Tobacco leaf slices. The Tobacco leaf slices were then incubated at 25° C. in dark conditions for 48 hours.

(3.2) Plant Tissue Culture

The leaf slices were washed with sterile distilled water (including 200 ug/ml cefotaxim) four times, and then explanted in a shooting medium (MS medium, 2 mg/L BA, 0.1 mg/L NAA, 200 mg/L cefotaxim, 100 mg/L kanamycin), and incubated under conditions of 25° C., 16 h/8 h photoperiod, and sub-cultured with a fresh medium every 2 weeks to perform washing and explanting on the selection medium.

In addition, shoots differentiated from the leaf slices were cut and explanted in a rooting medium (MS medium, including 200 mg/L cefotaxime), and incubated under conditions of 25° C. and 16 h/8 h photoperiod to perform explanting on the rooting medium.

Figure 3:
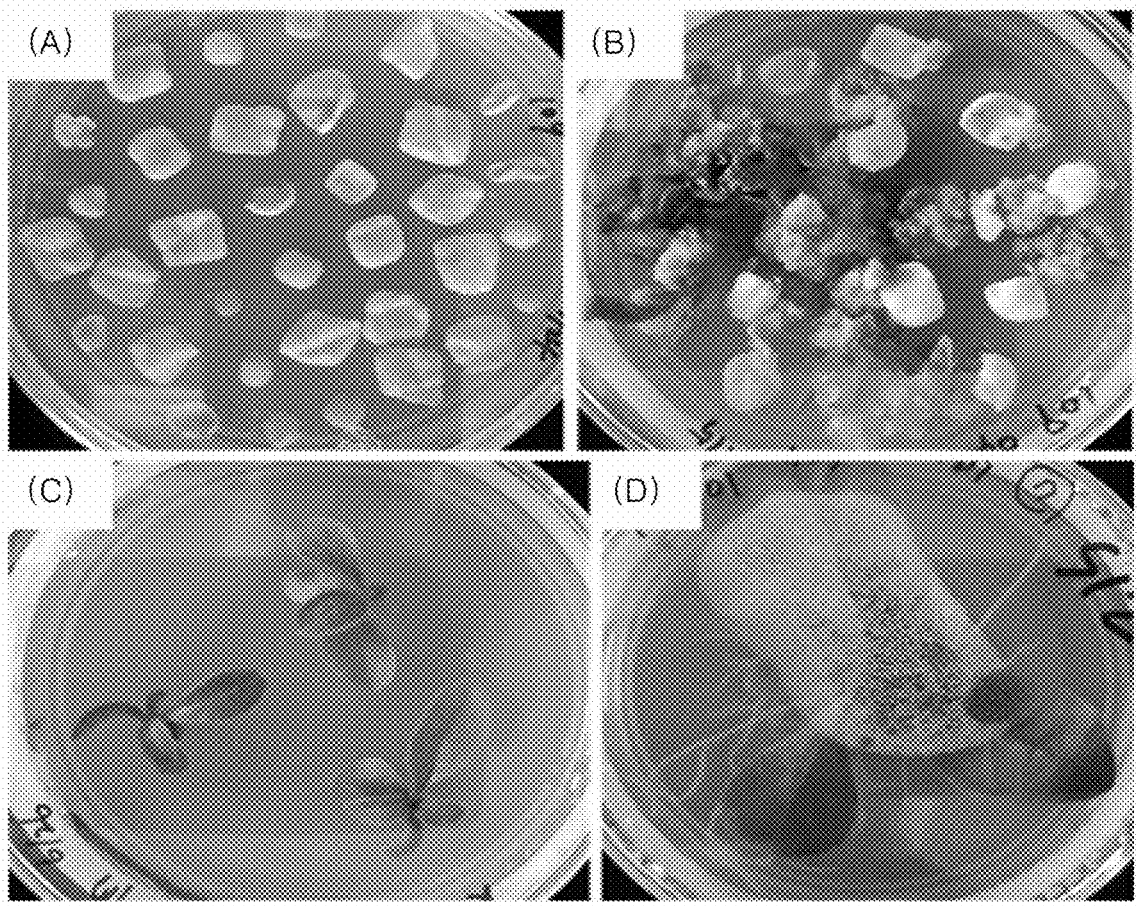
FIGS. 3A to 3D show photographs of each stage of plant tissue culture after transformation by an *Agrobacterium*-mediated transformation method, specifically.

As a result, as shown in FIG. 3, after transformation into tobacco leaf tissues by the *Agrobacterium*-mediated transformation method, whether callus differentiation, leaf differentiation, and root differentiation occurred well in sequence was confirmed. Through tissue culture, 102 individuals of tissue culture plantlets with leaves, stems, and roots were obtained.

(4) Selection of Variant (4.1) Examination of Mutation Occurrence and Patterns Thereof in Target Gene Each part of the leaves of the tissue cultures obtained in Example 1-(3) was collected, and gDNA was extracted therefrom, and then each target gene site was amplified through a PCR reaction. The nucleotide sequence of the amplified gene product was analyzed, and 50 tissue cultures with mutations in the NtHMA gene and 60 tissue cultures with mutations in the NtPCS gene were selected.

Figure 4:
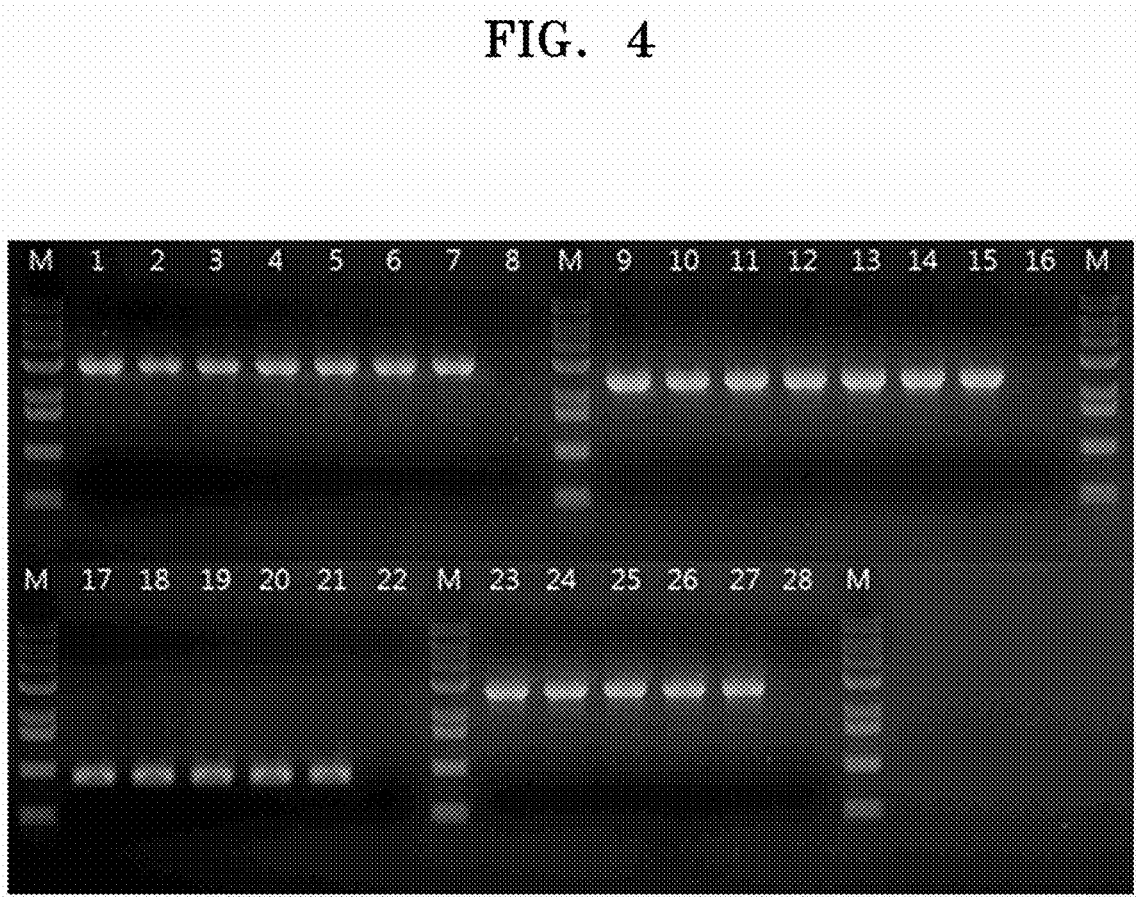
FIG. 4 shows results of electrophoresis by amplifying each target gene site with respect to gDNA of 24 individuals of tissue cultures to examine the occurrence and patterns of mutations (Lane M: 1 kb DNA marker, Lanes 1 to 7: amplification results of NtHMAα site, Lanes 9 to 15: amplification results of NtHMAβ site, Lanes 17 to 21: amplification results of NtPCSs site, Lanes 23 to 27: amplification results of NtPCSt site, Lanes 8, 16, 22, 28: Non-template control (NTC))

In detail, 100 mg of healthy leaf tissue was sampled and uniformly ground, and gDNA was extracted and purified using a commercial kit (e.g., Nucleospin 96 plant II, Macherey Nagel, Germany) using a silica column. FIG. 4 shows results of electrophoresis by amplifying each target gene site with respect to gDNAs of 24 individuals of tissue cultures to examine the occurrence and patterns of mutations.

Figure 5:
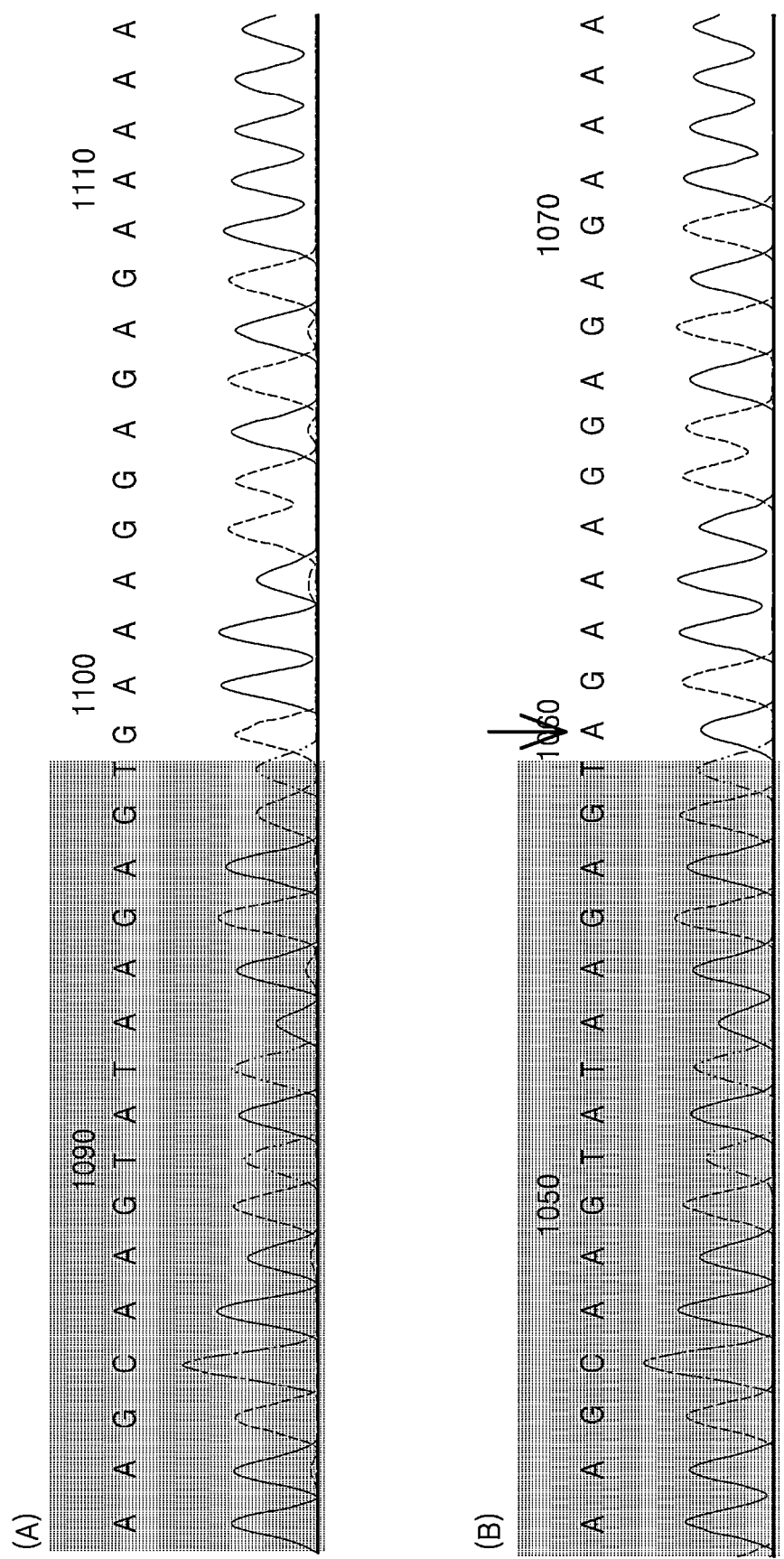
FIGS. 5A and 5B show results of sequencing analysis of NtHMAβ sites of a wild-type KB108 and a variant, specifically.

FIG. 5 shows an illustration of base sequence analysis by amplifying the target gene site through PCR, after extraction/purification of gDNA from the leaf tissue. As shown in FIG. 5, as a result of nucleotide sequence analysis of the NtHMAβ sites of the wild-type KB108 and the variant, it was confirmed that an adenine base was inserted in the nucleotide sequence of the variant, as compared with the nucleotide sequence of the wild-type.

The mutation patterns of the NtHMA gene were classified according to the site, and as a result, as shown in Table 6 below, mutation rates were 44% to 48% at the sites of gRNA_HMA_A4 and gRNA_HMA_B4 prepared by targeting exon 2, and it was confirmed that the mutation occurred most frequently at the exon 2 site of the NtHMA gene.

TABLE 6

| Target | Site | | Number of mutation | Number of tissue culture | Mutation rate (%) |
|---|---|---|---|---|---|
| gRNA_HMA_A1 | HMA α | Exon 1 | 1 | 25 | 4 |
| gRNA_HMA_A2 | | Intron 1 | 3 | | 12 |
| gRNA_HMA_A3 | | Intron 1 | 0 | | 0 |
| gRNA_HMA_A4 | | Exon 2 | 12 | | 48 |
| gRNA_HMA_A5 | | Exon 2 | 2 | | 8 |
| gRNA_HMA_A6 | | Intron 2 | 10 | | 40 |
| gRNA_HMA_B1 | HMA β | Exon 1 | 5 | 25 | 20 |
| gRNA_HMA_B2 | | Intron 1 | 7 | | 28 |
| gRNA_HMA_B3 | | Intron 1 | 0 | | 0 |
| gRNA_HMA_B4 | | Exon 2 | 11 | | 44 |
| gRNA_HMA_B5 | | Exon 2 | 5 | | 20 |
| gRNA_HMA_B6 | | Exon 2 | 2 | | 8 |

The mutation patterns of the NtPCS gene were classified according to the site, and as a result, as shown in Table 7 below, mutation rates were 45% to 70% at the sites of gRNA_PCSs_e2, gRNA_PCSt_e2, and gRNA_PCSst_e2 prepared by targeting exon 2, and it was confirmed that the mutation occurred most frequently at the exon 2 site of the NtPCS gene.

TABLE 7

| Target | Site | | Number of mutation | Number of tissue culture | Mutation rate (%) |
|---|---|---|---|---|---|
| gRNA_PCSs_e1 | PCSs | Exon 1 | 0 | 20 | 0 |
| gRNA_PCSs_e2 | | Exon 2 | 12 | | 60 |
| gRNA_PCSt_e1 | PCSt | Exon 1 | 0 | 20 | 0 |
| gRNA_PCSt_e2 | | Exon 2 | 14 | | 70 |
| gRNA_PCSst_e1 | PCSs | Exon 1 | 0 | 20 | 0 |
| gRNA_PCSst_e2 | PCSt | Exon 2 | 9 | | 45 |

(4.2) Obtaining of Seeds of F1 Generation and Selecting of Introduced Gene-Removed Plants 50 individuals of the NtHMA gene variant and 60 individuals of the NtPCS gene variant, in which the mutations were identified, were transplanted into pots filled with bed soil, and grown in a greenhouse. Seeds of $F_1$ generation were obtained through self-pollination to remove the gene block introduced for CRISPR/Cas9 expression. The seeds of $F_1$ generation were seeded in a 128-hole tray and grown for 30 days, then the leaves were collected and uniformly grounded, and then gDNA was extracted and purified using a silica column and a commercial kit (e.g., Nucleospin 96 plant II, Macherey Nagel, Germany). PCR was performed using a 35S promoter and primers specifically amplifying the Cas9 DNA block. Sequences of the primers are shown in Table 8 below.

TABLE 8

| Primer | Sequence | PCR length | Note | SEQ ID NO: |
|---|---|---|---|---|
| F_C9 | GACCATCCTGGACTTCCT GAAGAGC | 420 bp | Cas 9 detected | 27 |
| R_C9 | TGCAGGTAGTACAGGTAC AGCTTCTCG | | | 28 |
| F_35S | GCTCCTACAAATGCCATC A | 195 bp | 35S promoter detected | 29 |
| R_35S | GATAGTGGGATTGTGCGT CA | | | |

Figure 6:
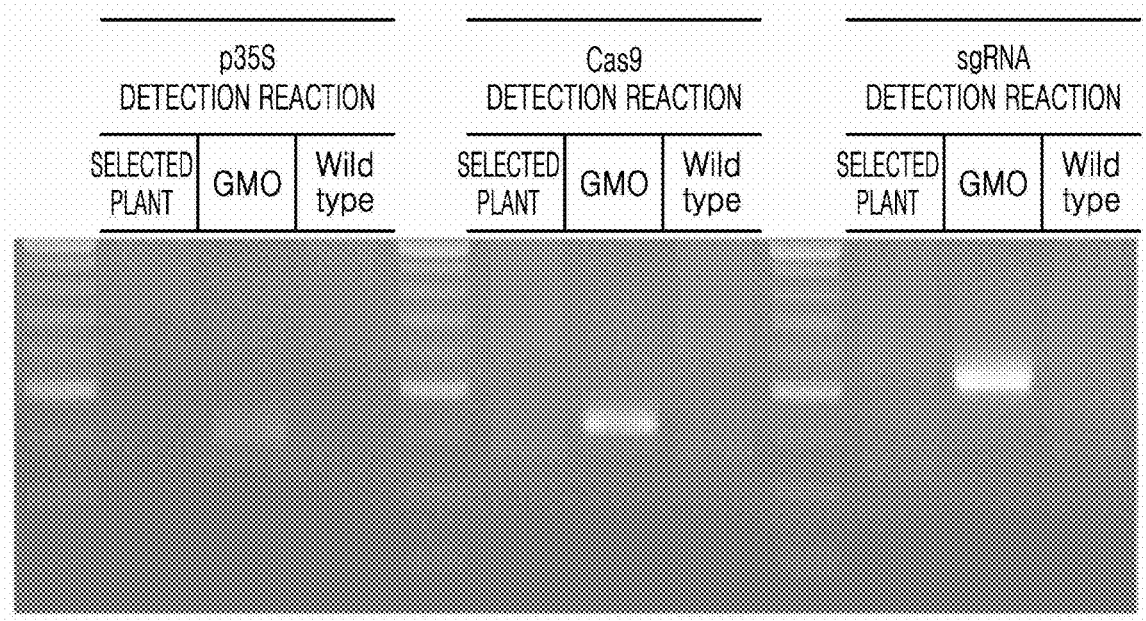
FIG. 6 shows results of electrophoresis after performing a gene amplification reaction to examine whether a gene introduced into an $F_1$ plant is inherited.

As a result, as shown in FIG. 6, plants in which the 535S promoter and the Cas9 DNA block were not detected, were selected.

(4.3) Genotyping Information of Final Selected Plants

The final selected F1 plants (108_PMTm_F1) did not include the introduced gene, and were plants, in which homozygous mutation occurred in each of the NtHMA genes and NtPCS genes. The genotypes of the final plants, in which mutations were induced in each of the NtHMA genes and the NtPCS genes, are shown in Table 9 below.

TABLE 9

| | Target | Mutation site | Mutation pattern |
|---|---|---|---|
| A6_02 | HMAα | Exon 2 | GT del |
| B6_02 | HMAβ | Exon 2 | T ins |
| AB_01 | HMAα | Exon 2 | GTGA del |
| | HMAβ | Intron 1 | T del |
| | | Exon 2 | A ins |
| | | Exon 2 | T ins |
| T_05 | PCSt | Exon 2 | T ins |
| ST_01 | PCSs | Exon 2 | A ins |
| | PCSt | Exon 2 | A ins |

In addition, the gDNA nucleotide sequences, GDS nucleotide sequences, and amino acid sequences of the PCSs genes and PCSt genes of the control plant (KB108), and the plant (PCSst), in which mutations were induced in the NtPCSs and NtPCSt genes are summarized and shown in Table 10 below.

TABLE 10

| Plant | Type | SEQ ID NO: | Abbreviation |
|---|---|---|---|
| KB108 | PCSs_gDNA | 31 | KB108_PCSs_gDNA |
| | PCSs_CDS | 32 | KB108 PCSs_CDS |
| | PCSs_amino acid | 33 | KB108 PCSs_AA |
| | PCSt_gDNA | 34 | KB108_PCSt_gDNA |
| | PCSt_CDS | 35 | KB108_PCSt_CDS |
| | PCSt_amino acid | 36 | KB108_PCSt_AA |
| PCSst | PCSs_gDNA | 37 | PCSst PCSs_gDNA |
| | PCSs CDS | 38 | PCSst PCSs_CDS |
| | PCSs_amino acid | 39 | PCSst_PCSs_AA |
| | PCSt_gDNA | 40 | PCSst_PCSt_gDNA |
| | PCSt_CDS | 41 | PCSst_PCSt_CDS |
| | PCSt_amino acid | 42 | PCSst_PCSt_AA |

(In the amino acid sequence, * represents a stop codon, and the stop codon in the middle of the amino acid sequence represents an early stop codon caused by a mutation in the nucleic acid sequence.)

For reference, amino acid sequences of SEQ ID NO: 39 and SEQ ID NO: 42 are as follows.

SEQ ID NO: 39:
MAMAGLYRRV LPSPPAVDFA STEGKQLFLE AIQNGNNGRI

FQVDLLFSDT V*TGLLWFG* PFHGLECPCY *SRKKMER

SEQ ID NO: 42:
MAMAGLYRRV LPSPPAVDFA STEGKQLFLE AIQNGNNGRI

FQVDLLFSDT V*TGLLWFG* PFYGLECPCY *SRKKMERAL

EMV**IYVGL L*ASGEG*S* RDLFWESGMF GSLCRSEGRS

FSL*S*YY** LP*TSHGLHY ***LSSDLII S*RPF*ADRF

GPLFAYWWLS RGKGYGTDSR CCEV*ISSSL GSPPSPLGSH

EHN**SYRIT *GVYANY*AS QSSCTAIYPE L*T*ELGHYL

KAFDG*SSCP VKF*ECEGHK RCSLYCSFKS TFKFC*IHKV

DSGSSKARGE WSKFE*RGER KASYQGRGIE TSAGHSSL*A

CHKHFIFKKF YLPVKSSIRQ QFG*CCRKHL LPRSRSFCRK

IWFIG*VLLS PNMC*MLQSY RGQFCYSGVW DSCKWEWGAG

G*CSGPYISS KD*LLSLRAS WLLANAPCK* RCADSTIAGI

TSTYMVSNKR YEGLAGNREP CLSREPASFA ARRDFAPART

VPPPQEMQG* QGRRRFSCTS LL

Example 2. Analysis of Cadmium Content in Tobacco Plant with Mutated NtPCS Gene (1) Analysis of Cadmium Content Using Hydroponic Culture System The germinated plants were transplanted to a hydroponic culture system, and then the flower stalk was cut from each plant grown for 80 days, and 2 weeks later, all leaves of each plant were harvested, and the harvested leaves were dried in a dry oven at 65° C. for 48 hours. Then, the leaves were put in a container containing glass beads and ground using a gyro-shaker. Experiments were conducted by dividing primary and secondary experiments according to the time of obtaining the plant variants. The cadmium contents of KB108 (wild-type, control) and variants were quantitatively analyzed by a GC/MS analytical technique. The results of the two experiments were expressed as a relative amount compared to the cadmium absorption amount of the control plant.

Figure 7:
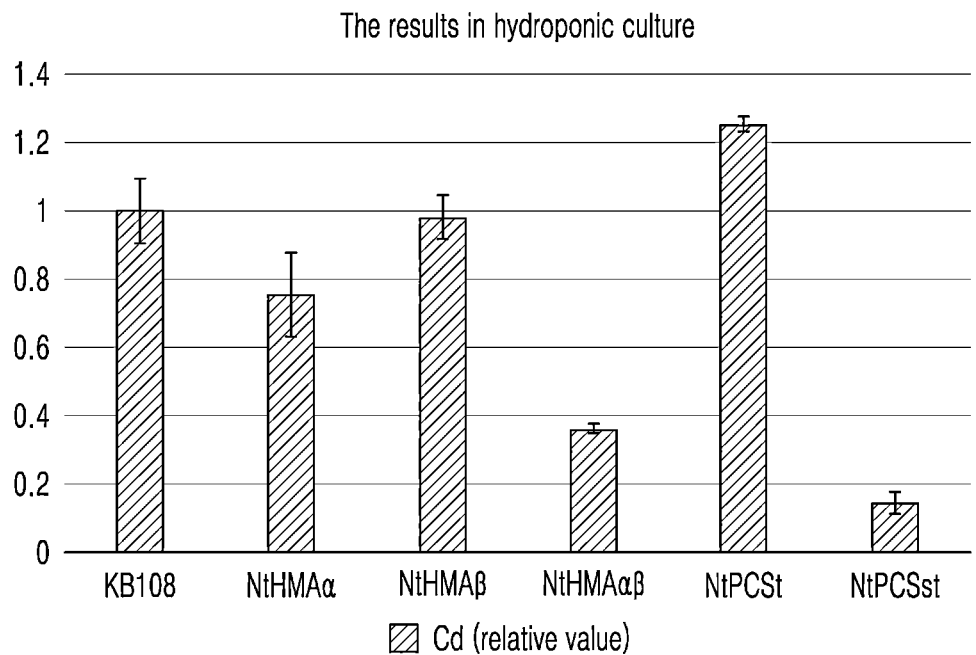
FIG. 7 shows a graph showing relative values of the cadmium contents, based on the cadmium content of a control group, by summarizing results of primary and secondary cadmium content analysis performed in a hydroponic culture system.

As a result, as shown in FIG. 7 and Table 11 below, the cadmium content in the leaves of the plants with the mutated NtHMAα or NtHMAβ gene was reduced by 25% or 2%, as compared with that of the control group, and the cadmium content in the leaves of the plants with both the mutated NtHMAα and NtHMAβ genes was reduced by 64%, as compared with that of the control group. In particular, the cadmium content in the leaves of the plants with both the mutated NtPCSs and NtPCSt genes was reduced by 85%, as compared with that of the control group, indicating a remarkable cadmium reduction effect. These plants show the excellent cadmium reduction effect, even as compared with the plants with both the mutated NtHMAα and NtHMAβ genes.

TABLE 11

| Plant | Cadmium (Relative value) |
| --- | --- |
| KB108 (Control) | 1.00 |
| NtHMAα | 0.75 |
| NtHMAβ | 0.98 |
| NtHMAαβ | 0.36 |
| NtPCSt | 1.25 |
| NtPCSst | 0.15 |

(2) Analysis of Cadmium Content in Greenhouse Environment

To examine whether the effect of reducing cadmium absorption of plants with the mutated NtPCS gene is maintained in the soil environment, a cadmium absorption experiment was performed in a greenhouse environment. In detail, each of the germinated plants was transplanted to a pot in a greenhouse environment, and then the flower stalk was cut from each plant grown for 60 days, and 2 weeks later, all leaves of each plant (lower leaves, upper leaves, or entire leaves) were harvested, and the harvested leaves were dried in a dry oven at 65° C. for 48 hours. Then, the leaves were put in a container containing glass beads and ground using a gyro-shaker. The cadmium contents of KB108 (wild-type, control) and variants were quantitatively analyzed by a GC/MS analytical technique.

Figure 8:
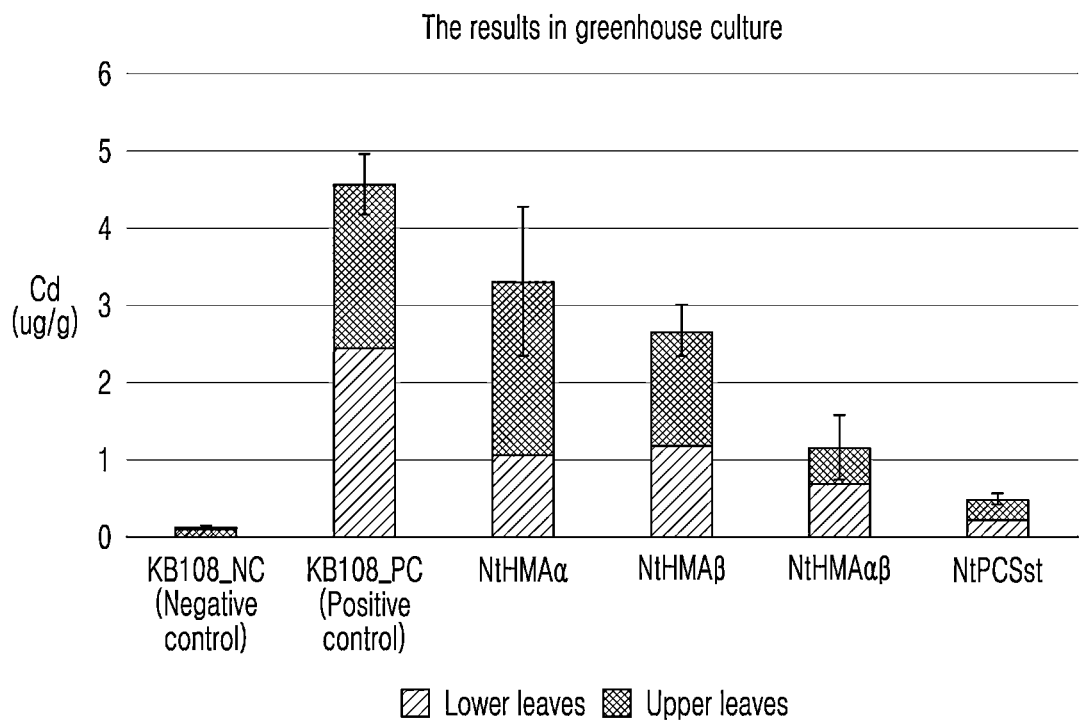
FIG. 8 shows results of analyzing the cadmium contents of plants cultured in a greenhouse soil environment.

As a result, as shown in FIG. 8 and Table 12 below, cadmium was rarely detected in a control group without cadmium treatment (KB108_NC), whereas a very high level of cadmium above the limit of quantitation (LOQ) of the assay was detected in a control group with cadmium treatment (KB108_PC). The cadmium content in the leaves of the plants with the mutated NtHMAα or NtHMAβ gene was reduced by about 26%, as compared with that of the control group, and the cadmium content in the leaves of the plants with both the mutated NtHMAα and NtHMAβ genes was reduced by about 77%, as compared with that of the control group. In particular, the cadmium content in the leaves of the plants with both the mutated NtPCSs and NtPCSt genes was reduced by about 87%, as compared with that of the control group, indicating a remarkable cadmium reduction effect. These plants show the excellent cadmium reduction effect, even as compared with the plants with both the mutated NtHMAα and NtHMAβ3 genes.

TABLE 12

| Plant | Lower leaves Cadmium content (μg/g) | Upper leaves Cadmium content (μg/g) | Whole leaves Cadmium content (μg/g) |
| --- | --- | --- | --- |
| KB108_NC (Negative control) | 0.08 | 0.04 | 0.13 |
| KB108_PC (Positive control) | 2.44 | 2.13 | 4.57 |
| NtHMAα | 1.05 | 2.27 | 3.31 |
| NtHMAβ | 1.19 | 1.48 | 2.67 |
| NtHMAαβ | 0.68 | 0.48 | 1.16 |
| NtPCSst | 0.23 | 0.26 | 0.49 |

Taken together, the cadmium content in the leaves of plants with both the mutated NtPCSs and NtPCSt genes was reduced by 86%, as compared with that of the control, under the hydroponic environment, and reduced by 87%, as compared with the control, under the soil environment, indicating the highest cadmium reduction effect.

Example 3. Examination of Growth Characteristics of Tobacco Plant with Mutated NtPCS Gene To examine whether the NtPCS mutant plants are able to overcome a growth inhibition phenomenon, which is the limit of the NtHMA mutant plant, the growth characteristics of plants with the mutated NtHMAα and/or NtHMAβ3 gene(s), and plants with both the mutated NtPCSs and NtPCSt genes were compared to those of control groups. In detail, the plant height, the number of leaves, and the weight of leaves of five individuals for each plant type were measured and compared.

Figure 9:
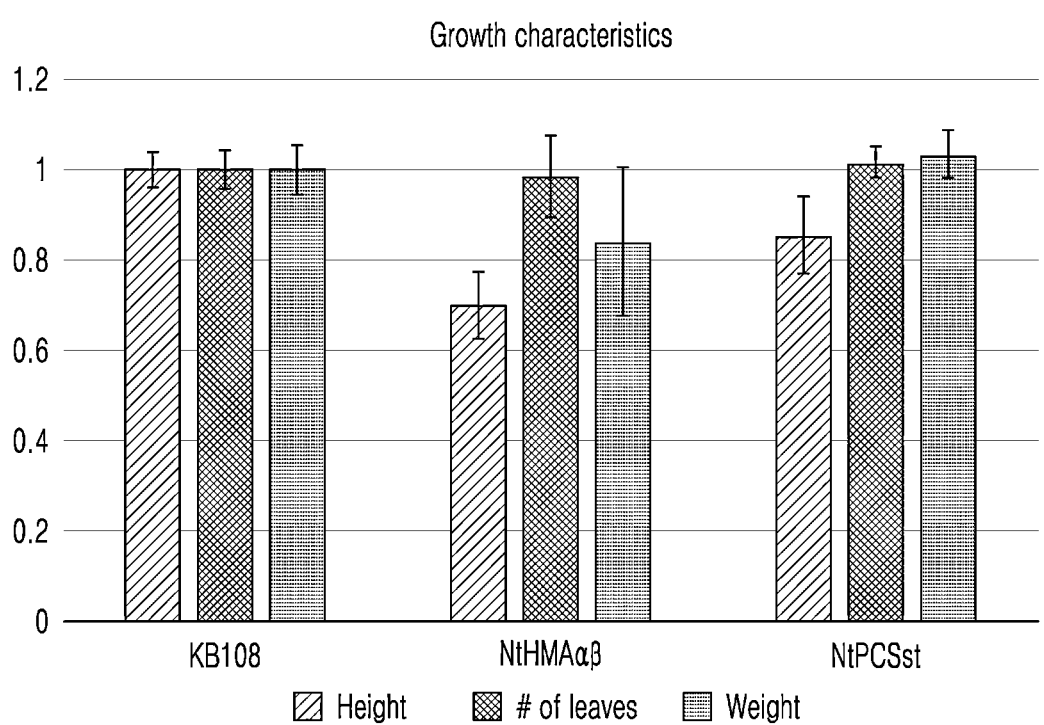
FIG. 9 shows a graph of comparing growth characteristics of an NtHMAαβ variant and an NtPCSst variant, as compared with the control KB108 (Height: height of plant, # of leaves: number of leaves, Weight: weight of leaves)

As a result, as shown in FIG. 9 and Table 13 below, the plants with both the mutated NtHMAα and NtHMAβ3 genes showed a 30% decrease in the plant height, no significant difference in the number of leaves, and a 16% decrease in the weight of the leaves, as compared with the control group. These results indicate that plants with the mutated NtHMAα and NtHMAβ3 genes exhibit growth inhibition. In contrast, the plants with both the mutated NtPCSs and NtPCSt genes showed a 15% slight decrease in the plant height, but no significant changes in the number and weight of leaves, as compared with the control group, indicating no growth inhibition.

TABLE 13

| No. | Plant | Height (cm) | Number of leaves | Weight of leaves (g) |
| --- | --- | --- | --- | --- |
| 1 | KB108 | 62 | 12 | 145.5 |
| 2 | (Control) | 66 | 13 | 149.0 |
| 3 | | 63 | 13 | 142.0 |
| 4 | | 68 | 13 | 142.0 |

TABLE 13-continued

| No. | Plant | Height (cm) | Number of leaves | Weight of leaves (g) |
|---|---|---|---|---|
| 5 |  | 67 | 12 | 129.0 |
|  | Mean | 65.2 | 12.6 | 141.5 |
| 1 | NtHMAα | 45 | 13 | 146.0 |
| 2 | Mutant | 55 | 13 | 167.0 |
| 3 |  | 53 | 13 | 154.0 |
| 4 |  | 52 | 13 | 156.0 |
| 5 |  | 53 | 13 | 163.0 |
|  | Mean | 51.6 | 13 | 157.2 |
| 1 | NtHMAβ | 58 | 12 | 144.6 |
| 2 | Mutant | 51 | 14 | 169.0 |
| 3 |  | 57 | 13 | 176.0 |
| 4 |  | 58 | 14 | 172.0 |
| 5 |  | 54 | 13 | 160.0 |
|  | Mean | 55.6 | 13.2 | 164.32 |
| 1 | NtHMAαβ | 50 | 11 | 108.5 |
| 2 | Mutant | 50 | 12 | 157.5 |
| 3 |  | 40 | 14 | 123.0 |
| 4 |  | 41 | 12 | 107.0 |
| 5 |  | 47 | 13 | 99.0 |
|  | Mean | 45.6 | 12.4 | 117.0 |
| 1 | NtPCSst | 61 | 13 | 145.0 |
| 2 | Mutant | 60 | 13 | 158.0 |
| 3 |  | 57 | 13 | 149.0 |
| 4 |  | 54 | 13 | 142.0 |
| 5 |  | 47 | 12 | 138.0 |
|  | Mean | 55.8 | 12.8 | 146.4 |

Figure 10:
FIG. 10 shows photographs in which the growth status of the NtHMAαβ variant and the NtPCSst variant, as compared with the control KB108, was observed with the naked eye.
Figure 10:

In addition, as shown in FIG. 10, the NtHMAαβ variant showed growth inhibition detectable with the naked eye, as compared with the control group, whereas the NtPCSst variant showed no significant difference in the growth, as compared with the control group.

The invention claimed is:

1. A cell of a *Nicotiana* species plant having reduced heavy metal absorption in which expression or activity of a phytochelatin synthase (PCS) gene or a protein encoded by the PCS gene is reduced by a CRISPR/Cas9 system comprising a single guide RNA(sgRNA) targeting the PCS gene, as compared with a wild-type cell,
wherein the PCS gene is a PCS gene derived from *Nicotiana sylvestris* (NtPCSs), a PCS gene derived from *Nicotiana tomentosiformis* (NtPCSt), or a combination thereof (NtPCSst),
wherein the sgRNA targeting the NtPCSs gene consists of the nucleotide sequence of SEQ ID NO: 1 or SEQ ID NO: 2, the sgRNA targeting the NtPCSt gene consists of the nucleotide sequence of SEQ ID NO: 3 or SEQ ID NO: 4, and the sgRNA targeting the NtPCSs gene and the NtPCSt gene consists of the nucleotide sequence of SEQ ID NO: 5 or SEQ ID NO: 6.

2. The cell of claim 1, wherein the plant is *Nicotiana tabacum*.

3. A plant having reduced heavy metal absorption, comprising the cell of claim 1.

4. A method of reducing heavy metals in a plant of a *Nicotiana* species, the method comprising reducing expression or activity of a PCS gene or a protein encoded by the PCS gene by a CRISPR/Cas9 system comprising a single guide RNA(sgRNA) targeting the PCS gene, as compared with a wild-type cell of the plant,
wherein the PCS gene is a PCS gene derived from *Nicotiana sylvestris* (NtPCSs), a PCS gene derived from *Nicotiana tomentosiformis* (NtPCSt), or a combination thereof (NtPCSst),
wherein the sgRNA targeting the NtPCSs gene consists of the nucleotide sequence of SEQ ID NO: 1 or SEQ ID NO: 2, the sgRNA targeting the NtPCSt gene consists of the nucleotide sequence of SEQ ID NO: 3 or SEQ ID NO: 4, and the sgRNA targeting the NtPCSs gene and the NtPCSt gene consists of the nucleotide sequence of SEQ ID NO: 5 or SEQ ID NO: 6.

5. The method of claim 4, wherein the heavy metal is one or more selected from the group consisting of cadmium, arsenic, antimony, lead, mercury, chromium, tin, zinc, barium, bismuth, nickel, cobalt, manganese, iron, copper, and vanadium.

* * * * *